(12) United States Patent
Belcher

(10) Patent No.: US 7,546,019 B1
(45) Date of Patent: Jun. 9, 2009

(54) SLACK CABLE ENCLOSURE

(76) Inventor: Donald S. Belcher, 4211 Travis St., Suite 101, Dallas, TX (US) 75205

( * ) Notice: Subject to any disclaimer, the term of this patent is extended or adjusted under 35 U.S.C. 154(b) by 0 days.

(21) Appl. No.: 11/966,759

(22) Filed: Dec. 28, 2007

(51) Int. Cl.
*G02B 6/00* (2006.01)

(52) U.S. Cl. ............... 385/135; 385/134; 385/136; 385/137

(58) Field of Classification Search ............. 385/134, 385/135, 136, 137, 138
See application file for complete search history.

(56) References Cited

U.S. PATENT DOCUMENTS

| | | | | |
|---|---|---|---|---|
| 5,661,840 | A | * | 8/1997 | Caveney ............... 385/135 |
| 5,947,765 | A | * | 9/1999 | Carlson et al. ............... 439/535 |
| 6,167,183 | A | * | 12/2000 | Swain ............... 385/135 |
| 7,359,611 | B1 | * | 4/2008 | Kaplan ............... 385/135 |
| 7,394,023 | B2 | * | 7/2008 | Rizzuto, Jr. ............... 174/92 |
| 2002/0197048 | A1 | * | 12/2002 | Kwon et al. ............... 385/138 |

* cited by examiner

*Primary Examiner*—Brian M Healy
(74) *Attorney, Agent, or Firm*—Howison & Arnott, L.L.P.

(57) ABSTRACT

An enclosure for storing cables includes a base section having a bottom wall, opposed first and second sidewalls and opposed third and fourth sidewalls, the first and second sidewalls of the base section having first slots formed generally midway along the length thereof, the third sidewall of the base section having a second slot extending through the upper edge toward the bottom wall, a cover section having a top wall, opposed first and second sidewalls and opposed third and fourth sidewalls, the first and second sidewalls of the cover section each having third slots, the third sidewall of the cover section having a fourth slot formed generally midway along the length of the sidewall, the fourth slot extending through the lower edge of the third sidewall toward the top wall, wherein the base section is received in the cover section with the first slots aligned with the third slots and the second slot aligned with the fourth slot, the slots having a length sufficient to define variable height first, second and third passageways through overlapping portions of the first, second and third sidewalls of the base section and cover section, the passageways having variable height to accommodate different numbers of cables routed through the enclosure by means of the passageways.

20 Claims, 14 Drawing Sheets

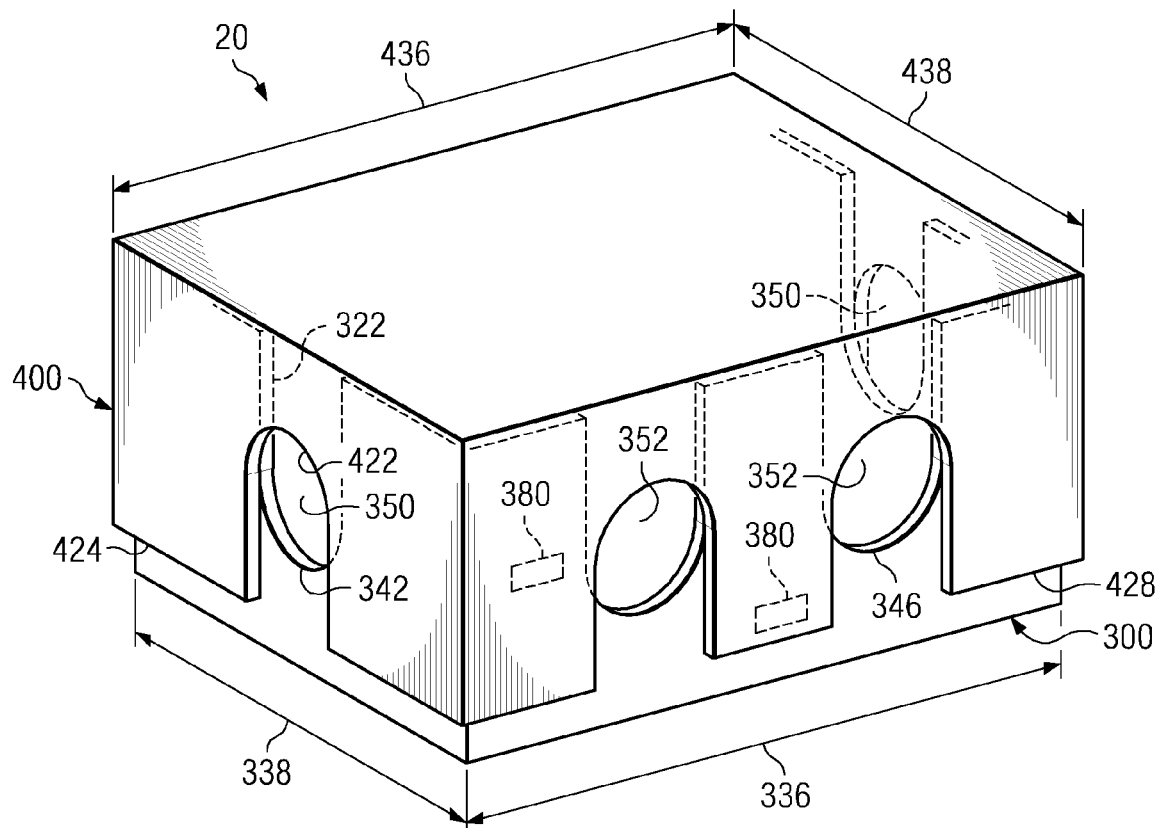
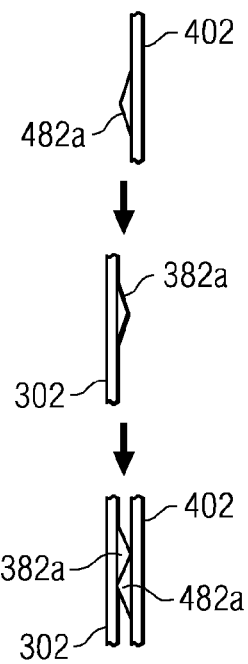 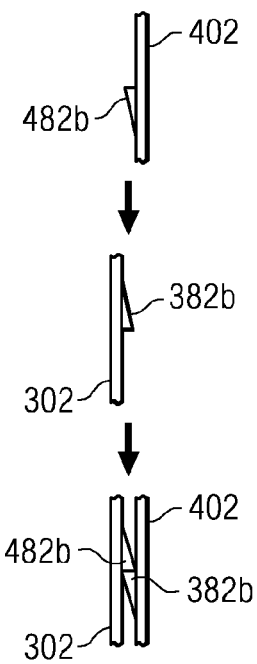 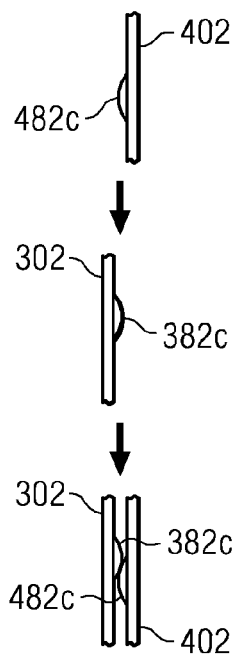
FIG. 7
FIG. 8    FIG. 9    FIG. 10

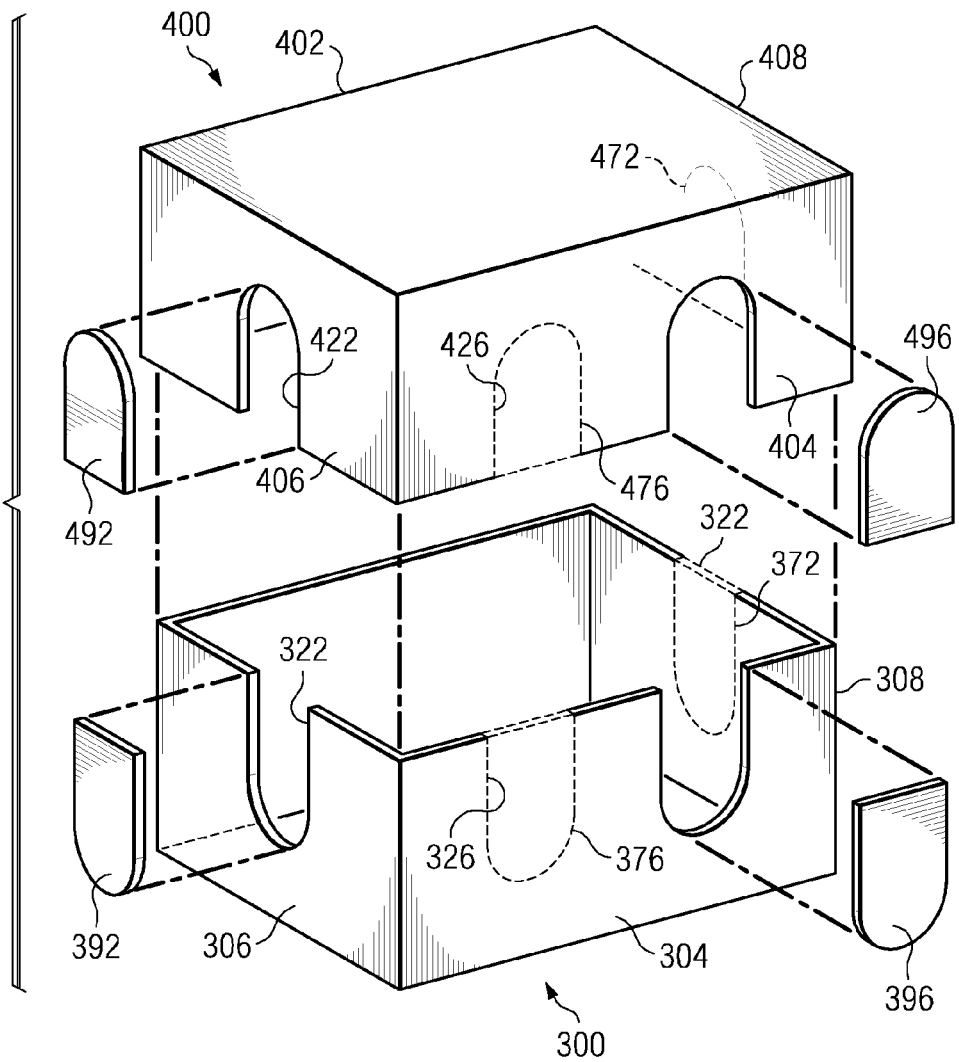
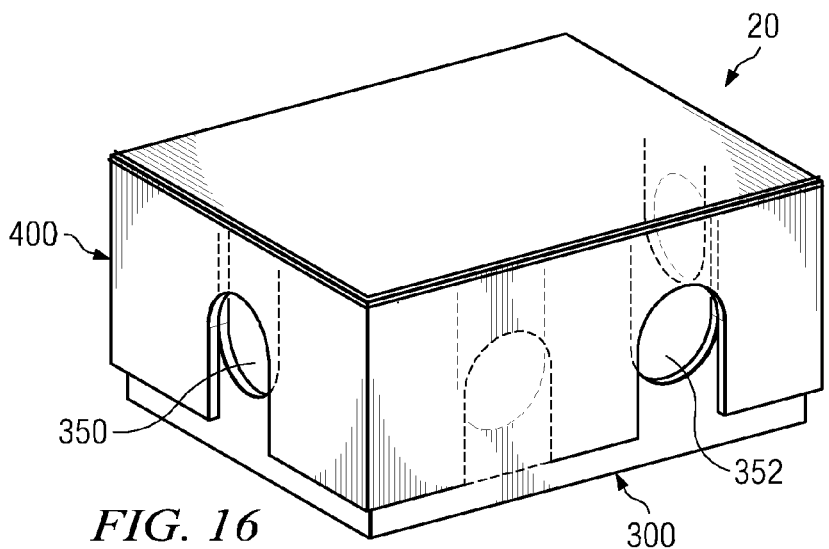

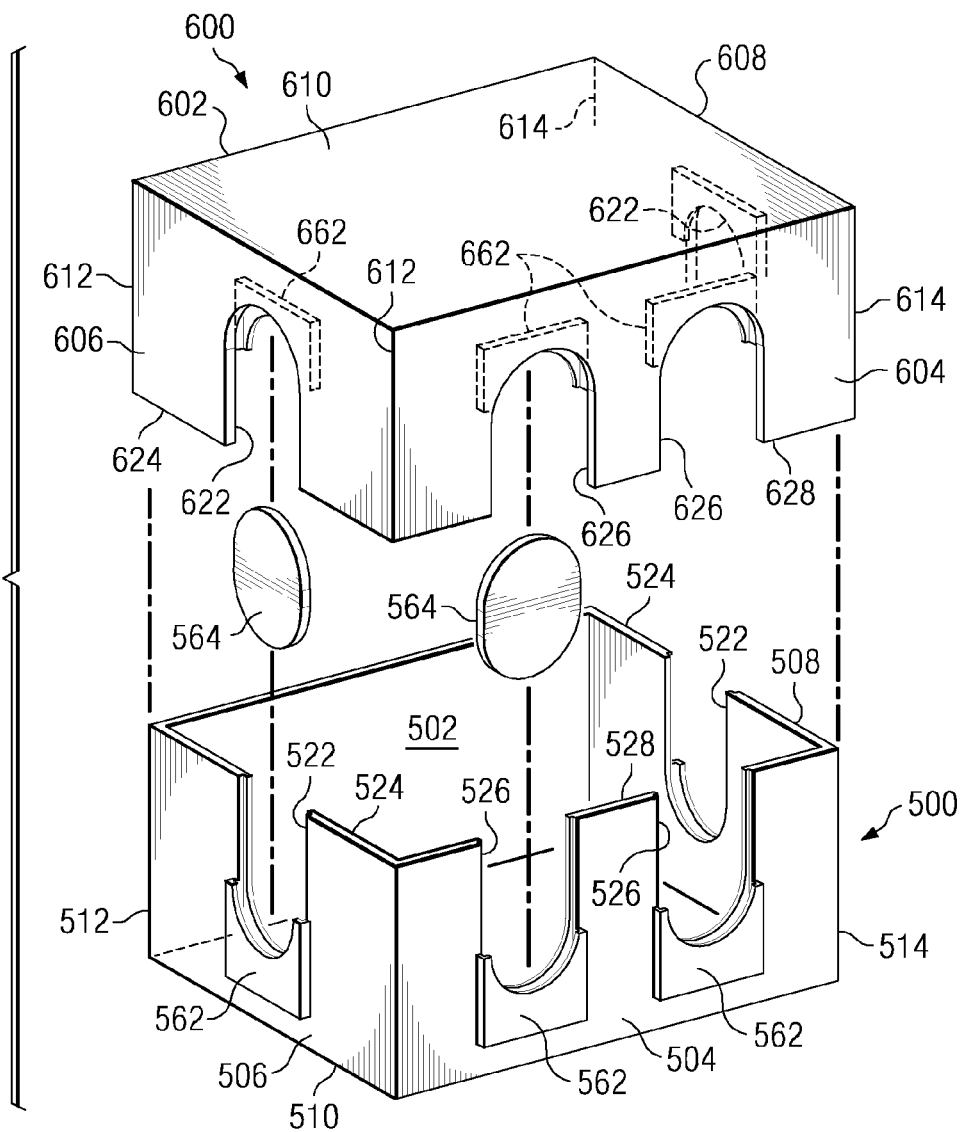
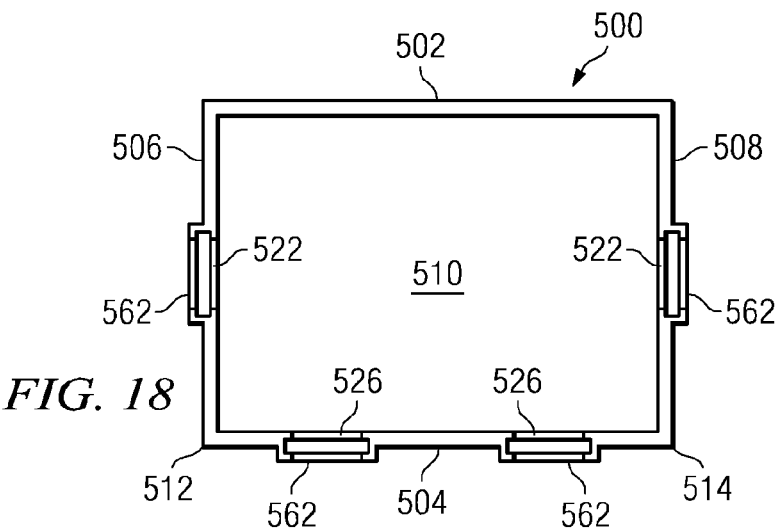

SLACK CABLE ENCLOSURE

TECHNICAL FIELD

The disclosure relates to storage devices for cable slack and in particular to an improved enclosure having a base and cover section that cooperate to provide openings for routing cables in and out of the enclosure.

BACKGROUND

Most, if not all, personal computers and similar devices are connected to one or more auxiliary devices or inputs with cables. These cables connect personal computers and similar devices to area networks, broadband sources, telephones, power sources, printers, fax machines, cameras, modems, display devices such as monitors, speakers and similar devices. A single computer can easily have four to six cable connections to such devices and inputs. Since these cables normally are supplied in standard lengths, the cables are almost always longer than necessary, resulting in excess cable or slack. The slack portions of multiple cables used in connection with, for example, a personal computer typically end up as a tangled snarl of different cables, shoved under, alongside or behind a desk, computer or elsewhere.

Cable reels with mechanisms for paying out and retracting single cables are known. Typically these devices have include a length of cable wound on a spring loaded or manually operated reel with a first connector on a first cable end adjacent the reel and a second connector on the second cable end. The user connects the first cable connector to the first connection point and pulls the second end of the cable to the second connection point, unreeling the cable from the spool or reel. Such devices may eliminate the slack in a single cable, but do not provide a solution for devices using multiple cable to connect to multiple other devices and sources.

SUMMARY

An enclosure for storing cables includes a base section having a bottom wall, opposed first and second sidewalls, and opposed third and fourth sidewalls. The first sidewall has first and second ends joined to first ends of the third and fourth sidewalls along the height of the sidewalls, the second sidewall being joined to second ends of the third and fourth sidewall along the height thereof. The first, second, third and fourth sidewalls are joined to the bottom wall along lower edges of the sidewalls with the bottom wall, with opposed first and second sidewalls, and opposed third and fourth sidewalls defining a generally rectangular container having an open side and an outer length and width. The first and second sidewalls of the base section have first slots formed generally midway along the length thereof, each of the first slots extending through upper edges of the first and second sidewalls toward the bottom wall. Each of the first slots has a length less than the height of the first and second sidewalls so that the first and second sidewalls extend continuously from end-to-end below the slot. The third sidewall of the base section has a second slot extending through the upper edge toward the bottom wall, the second slot having a length less than the height of the third sidewall such that the third sidewall extends continuously from the first and second ends thereof beneath the slot.

A cover section of the enclosure includes a top wall, opposed first and second sidewalls and opposed third and fourth sidewalls with the first sidewall having first and second ends joined to first ends of the third and fourth sidewalls along the height of the sidewalls. The second sidewall is joined to second ends of the third and fourth sidewall along the height of the sidewalls with the first, second, third and fourth sidewalls being joined to the top wall along upper edges thereof. The top wall, opposed first and second sidewalls and opposed third and fourth sidewalls define a generally rectangular container having an open side having an inner length and width sufficiently larger than the outer length and width of the base section such that the base section fits into the open side of the cover section with the top wall of the cover section substantially parallel to the bottom wall of the base and the sidewalls of the base section inside of, and substantially parallel to, the side walls of the cover section.

The first and second sidewalls of the cover section each have third slots formed generally midway along the length of the sidewalls with each of the third slots extending through lower edges of the first and second sidewalls toward the top wall. Each of the third slots has a length less than the height of the first and second sidewalls such that the first and second sidewalls extend continuously from end-to-end above the third slot. The third sidewall of the cover section has a fourth slot formed generally midway along the length of the sidewall. The fourth slot extends through the lower edge of the third sidewall toward the top wall and has a length less than the height of the third sidewall such that the third sidewall extends continuously from end-to-end beneath the fourth slot.

The base section is received in the cover section with the first slots aligned with the third slots and the second slot aligned with the fourth slot. The slots have a length sufficient to define variable height first, second and third passageways through overlapping portions of the first, second and third sidewalls of the base section and cover section, the passageways having variable height to accommodate different numbers of cables routed through the enclosure by means of the passageways.

In one variation, the enclosure includes a latching mechanism having a first component secured to an outer surface of at least two opposing ones of the first, second, third and fourth sidewalls of the base section. A second component of the latching mechanism is secured to an inner surface of at least two opposing ones of the first, second, third and fourth sidewalls of the cover section. The first components engage the second components when the cover section is placed over the base section to releasably secure the cover section onto the base section with the slots of the cover section aligned and overlapping the slots of the base section to form a plurality of passageways through overlapping portions of the sidewalls of the cover section and sidewalls of the base section.

In one aspect, the third sidewall of the base section has a fifth slot extending through the upper edge toward the bottom wall. The fifth slot has a length less than the height of the third sidewall such that the third sidewall extends continuously from the first and second ends thereof below the fifth slot. The third sidewall of the cover section has a sixth slot extending through the lower edge toward the top wall, the sixth slot having a length less than the height of the third sidewall such that the third sidewall extends continuously from the first and second ends thereof above the sixth slot. The base section is received in the cover section with the fifth slot aligned with the sixth slot, the slots having a length sufficient to define a variable height fourth passageway through overlapping portions of the third sidewalls of the base section and cover section.

In another variation, the enclosure includes a plurality of first latching members secured to an outer surface of at least two opposing ones of the first, second, third and fourth sidewalls of the base section. A plurality of second components are secured to an outer surface of at least two opposing ones of the first, second, third and fourth sidewalls of the cover section. The first components engage the second components when the cover section is placed over the base section to releasably secure the cover section onto the base section at a plurality of selected heights with the slots of the cover section aligned and overlapping the slots of the base section to form a plurality of passageways through overlapping portions of the sidewalls of the cover section and sidewalls of the base section.

In another variation, the third sidewall of the base section is formed with a pair of spaced apart second slots extending through the upper edge toward the bottom wall, the second slots each having a length less than the height of the third sidewall such that the third sidewall extends continuously from the first and second ends thereof beneath the slots. The third sidewall of the cover section is formed with a pair of spaced apart fourth slots extending through the lower edge toward the top wall, the fourth slots each having a length less than the height of the third sidewall of the cover section such that the third sidewall extends continuously from the first and second ends thereof above the slots. The base section is received in the cover section with the spaced apart second slots aligned with the spaced apart fourth slots, the slots having a length sufficient to define a pair of variable height passageways through overlapping portions of the third sidewalls of the base section and cover section, the passageways having variable height to accommodate different numbers of cables routed through the enclosure by means of the passageways.

In another variation, the base section is formed with exactly one first open-ended slot in each of opposing first and second sidewalls and exactly two spaced apart open-ended second slots formed in the third sidewall. The cover section is formed with exactly one open ended third slot in each of opposing first and second sidewalls and exactly two spaced apart open-ended fourth slots formed in the third sidewall. The base section is received in the cover section with the first slots aligned with the second slots and the spaced apart third slots aligned with the spaced apart fourth slots, the slots having a length sufficient to define first, second, third and fourth slots of variable height that form passageways through overlapping portions of the first, second and third sidewalls of the base section and cover section, the passageways having variable height to accommodate different numbers of cables routed through the enclosure by means of the passageways.

In other aspects, the base and/or cover sections of the enclosures may be formed from one or more of plastic, wood, cardboard and sheet metal. One or more of the slots may be defined by a series of perforations wherein the slot is opened by removing a portion of the corresponding sidewall within the perforation. The enclosure may include brackets positioned adjacent one or more of the slots, the brackets configured to receive blanks to close the corresponding passageway. Alternatively, a flexible curtain may be positioned over one or more of the slots to close the corresponding passageway. In one variation, a cable/enclosure assembly includes one or a plurality of cables routed though one or more of the passageways of the enclosure.

In other variations, the length of the slots may be greater than 50% of the height of the sidewalls. In other variations, the length of the slots may be preferably from about 60% to about 80% of the height of the corresponding sidewalls. In preferred variations, the width of the slots may vary from about 20% of the length of the slots to about 50% of the length of the slots.

In yet another aspect, a plurality of enclosures for storing cables includes a set of nested base sections including an inner base section, an outer base section and a plurality of base sections disposed between the inner and outer base sections in nested relationship. Each base section has a bottom wall, opposed first and second sidewalls and opposed third and fourth sidewalls, the first sidewall having first and second ends joined to first ends of the third and fourth sidewalls along the height thereof. The second sidewall is joined to second ends of the third and fourth sidewall along the height thereof with the first, second, third and fourth sidewalls being joined to the bottom wall along lower edges thereof to define a generally rectangular container having an open upper side, an outer length and width and an inner length and width wherein each successive base section between the inner base section and the outer base section has a slightly smaller outer length, and width than the inner outer length, and width of an adjacent base section in which it is nested.

The first and second sidewalls of each of the nested base sections have first slots formed generally midway along the length thereof, each of the first slots extending through upper edges of the first and second sidewalls toward the bottom wall, each of the first slots having a length less than the height of the first and second sidewalls such that the first and second sidewalls extend continuously from the first and second ends thereof beneath the slot. The third sidewall of each of the nested base sections has a second slot formed generally midway along the length thereof, the second slot extending through the upper edge toward the bottom wall, the second slot having a length less than the height of the third sidewall such that the third sidewall extends continuously from the first and second ends thereof beneath the slot.

A set of nested cover sections corresponding to the nested base sections, include an inner cover section, an outer cover section and a plurality of cover sections disposed between the inner and outer cover sections in nested relationship. Each of the nested cover sections has a top wall, opposed first and second sidewalls and opposed third and fourth sidewalls. The first sidewall has first and second ends joined to first ends of the third and fourth sidewalls along the height thereof, the second sidewall being joined to second ends of the third and fourth sidewall along the height thereof. The first, second, third and fourth sidewalls are joined to the top wall along upper edges thereof to define a generally rectangular container having an open side having an inner length and width slightly larger than the outer length and width of the corresponding base section. Each successive cover section between the inner cover section and the outer cover section has a slightly smaller outer length, and a width than the inner length, and width of an adjacent cover section in which it is nested.

The first and second sidewalls of each of cover sections each has a third slot formed generally midway along the length thereof with each of the third slots extending through lower edges of the first and second sidewalls toward the top wall. Each of the third slots has a length less than the height of the first and second sidewalls such that the first and second sidewalls extend continuously from the first and second ends thereof above the third slot. The third sidewall of each of the cover sections has a fourth slot formed generally midway along the length that extends through the lower edge of the third sidewall toward the top wall; the fourth slot having a length less than the height of the third sidewall such that the third sidewall extends continuously from the first and second ends thereof beneath the fourth slot.

The nested enclosures may each include a latching mechanism that has a first component secured to an outer surface of at least one of the first, second, third and fourth sidewalls of each base section and a second component secured to an outer surface of at least one of the first, second, third and fourth sidewalls of each cover section. When each base section is received in the corresponding cover section with the first slots aligned with the third slots and the second slots aligned with the fourth slots, the slots have a length sufficient to define first, second, third and fourth passageways through overlapping portions of the first, second and third sidewalls of the base section and cover when a sidewall of the base section is abutted against an inside surface of the top wall of the corresponding cover section. The first component of the latching member engages the second component of the latching member to releaseably secure the cover section over the corresponding base section.

In another aspect, the nested enclosures are arranged such that the slots of each base section are aligned in the nested plurality of base sections and the slots of each of the cover sections are aligned in the nested plurality of cover sections.

In another variation, the slots of the base and cover section have a length sufficient to define variable height passageways through overlapping portions of the sidewalls of the base section and cover section, the passageways having variable height to accommodate different numbers of cables routed through the enclosure by means of the passageways. In one aspect, the lower ends of the slots of the base section are horizontally aligned with lower edges of the sidewalls of the cover section when the cover section is fully seated on the base section.

BRIEF DESCRIPTION OF THE DRAWINGS

For a more complete understanding, reference is made to the drawings, wherein like reference numbers are used herein to designate like elements throughout, and wherein:

FIG. 7 is a perspective view of the assembled cover and base sections of FIGS. 5 and 6;

FIGS. 8-14 are partial side views of latching mechanisms suitable for use with enclosures according to the disclosure;

FIG. 15 is an exploded view of a variation of the enclosure of FIG. 7;

FIG. 16 is a perspective view of the enclosure of FIG. 15;

FIG. 17 is an exploded view of a yet another enclosure according to the disclosure;

FIG. 18 is a top view of the base section of FIG. 17;

DETAILED DESCRIPTION

Figure 1:
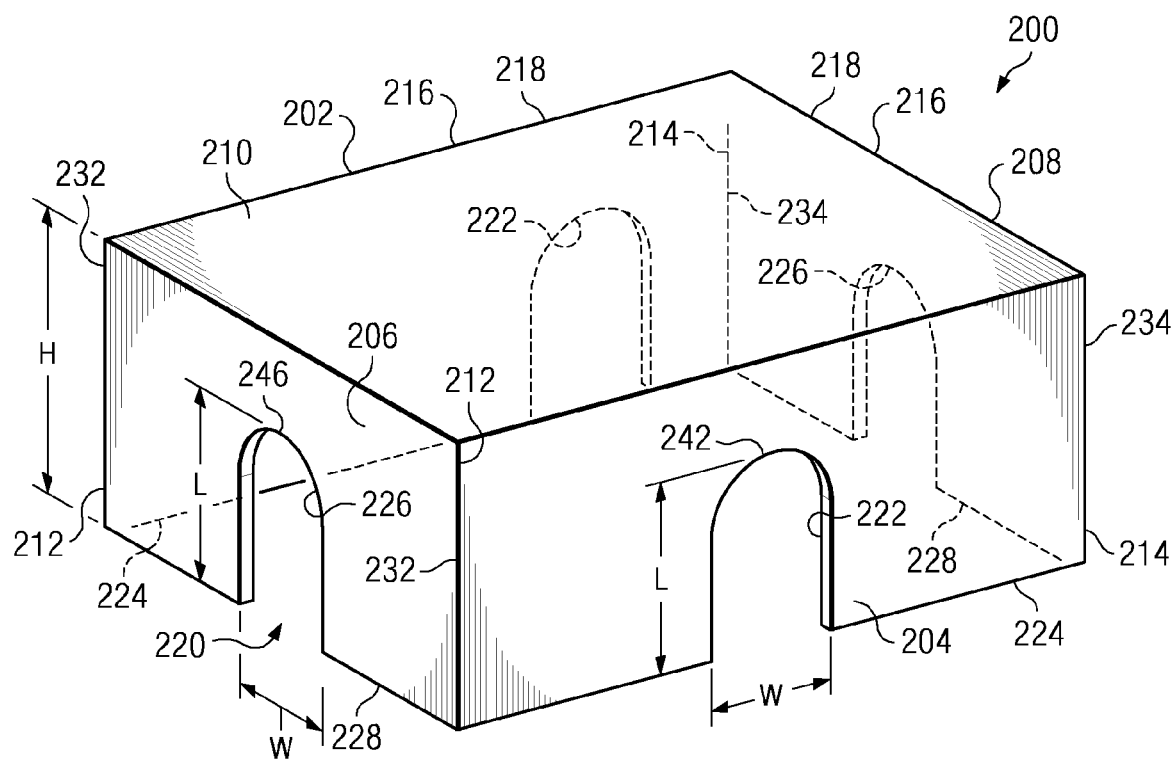
FIG. 1 is a perspective view of a cover section of slack cable enclosure according to the disclosure.

Referring now to the drawings, wherein like reference numbers are used herein to designate like elements throughout the various views, embodiments according to the disclosure are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Referring to FIGS. 1-4, in accordance with one variation, an enclosure 10 for storing cable slack includes base and removable cover sections 100 and 200, respectively, Base section 100 includes opposed first and second walls 102, 104, opposed third and fourth sidewalls 106, 108 and a bottom wall 110. First and second side walls 102, 104 are joined along first ends 112 to third sidewall 106 and along second ends 114 to fourth sidewall 108 along the height of the sidewalls. Sidewalls 102, 104, 106 and 108 are each joined along lower respective edges 116 to the edges 118 of bottom wall 110 to form a generally rectangular five-sided enclosure having an open side 120.

Figure 2:
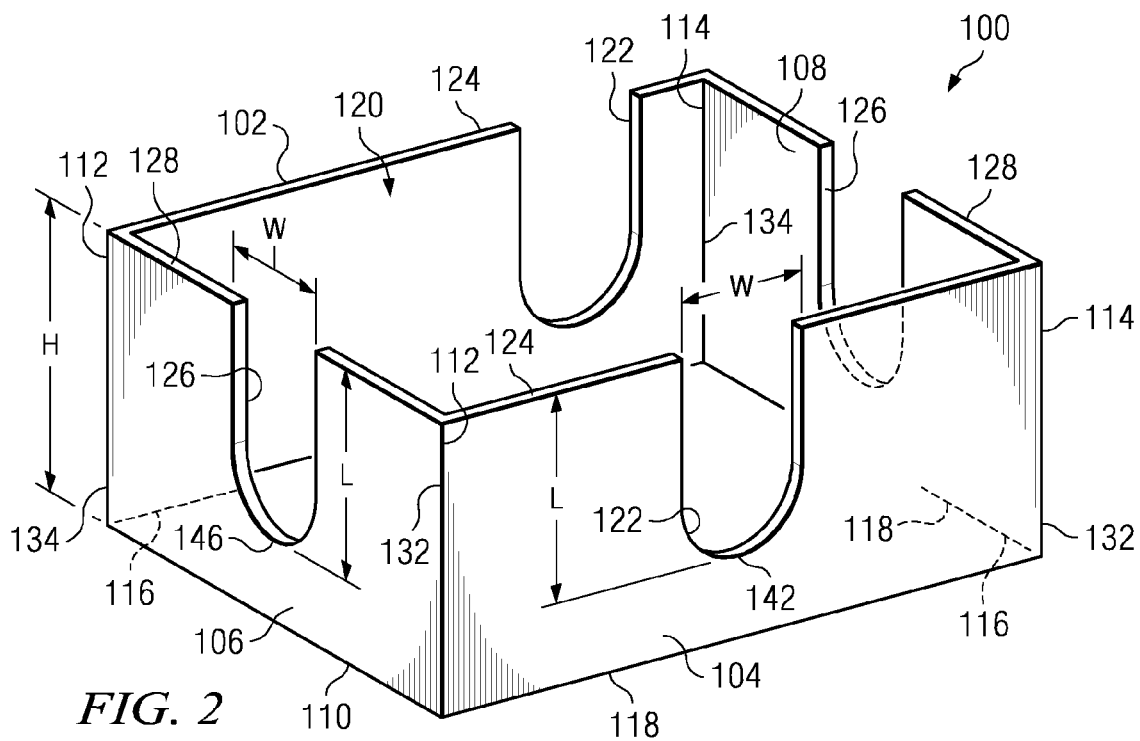
FIG. 2 is a perspective view of a base section of a slack cable enclosure of according to the disclosure.

As best illustrated in FIG. 2, base section 100 has opposed first open-ended slots 122 formed in first and second sidewalls 102, 104 approximately midway along the length of each of the sidewalls. Each of opposed slots 122 extends through the upper edges 124 of first and second sidewall 102, 104 toward bottom wall 110 and preferably has a length (denoted "L") greater than its width denoted "W". The length of slots 122 is less than the height (denoted "H") of first and second sidewalls 102, 104 such that the first and second sidewalls extend continuously between first and second ends 112, 114 beneath slots 122.

Third and fourth sidewalls 106, 108 have second slots 126 formed generally midway along the length of the sidewalls that extend through the upper edges 128 of the sidewalls toward the bottom wall 110. Second slots 126 preferably have a length L greater than width W with the length of the slots less than the height H of the third sidewall so that the third and fourth sidewalls extend continuously between the first and second ends 132, 134 of sidewalls 106, 108 beneath slots 126.

Open ended slots 122, 126 permit a user to route a cable into and out of base section 100 when cover section 200 is removed without disconnecting the cable from connected devices. This is a distinct advantage over an enclosure having holes through one or more walls that require a free end of the cable to be routed through the holes. Slots 122 may have the same or different dimensions as slots 126. In one variation, slots 122, 126 have the same dimensions. In order to retain structural integrity of sidewalls 102, 104, 106 and 108, slots 122, 126 are configured to extend only partially though the height of the sidewalls such that a portion of each sidewall extends continuously from end-to-end beneath the slots. In one embodiment, the length L of slots 122, 126 is greater than about 50% of the height H of the sidewalls, more preferably from approximately 60% to about 80% of the height H of the corresponding sidewalls 102-108; in another variation, the length L of slots 122, 126 is approximately 65% to about 75% of the height H of the corresponding sidewalls 102, 104, 106 and 108. The width W of slots 122, 126 may vary between about 20% of the length L of the slots to about 50% of the length of the slots; the foregoing dimensions being preferred to maintain the structural integrity of sidewalls 102, 104, 106 and 108.

Referring to FIG. 1, cover section 200 includes opposed first and second walls 202, 204, opposed third and fourth sidewalls 206, 208 and a top wall 210. First and second sidewalls 202, 204 are joined along first ends 212 to third sidewall 206 and along second ends 214 to fourth sidewall 208 along the height of the sidewalls. Sidewalls 202-208 are each joined along upper respective edges 216 to the edges 218 of top wall 210 to form a generally rectangular five-sided enclosure having an open side 220.

As illustrated, cover section 200 has opposed first open-ended slots 222 formed in first and second sidewalls 202, 204 approximately midway along the length of each of the sidewalls. Each of opposed slots 222 extends through the lower edges 224 of first and second sidewall 202, 204 toward top wall 210 and preferably has a length (denoted "L") greater than its width (denoted "W"). The length of slots 222 is less than the height (denoted "H") of first and second sidewalls 202, 204 such that the first and second sidewalls extend continuously between first and second ends 212, 214 above slots 222. In one embodiment, the length L of slots 222 is greater than about 50% of the height H of the sidewalls, preferably from approximately 60% to about 80% of the height H of sidewalls 202, 204. In another variation, the length L of slots 222 is approximately 65% to about 75% of the height H of sidewalls 202, 204. The width W of slots 222 may vary between about 20% of the length L of the slots to about 50% of the length L of the slot, the foregoing dimensions being preferred to maintain the structural integrity of sidewalls 202, 204.

Third and fourth sidewalls 206, 208 have second slots 226 formed generally midway along the length of the sidewalls that extend through lower edges 228 toward top wall 210. Second slots 226 preferably have a length L greater than width W with the length L of the slots less than the height H of third and fourth sidewalls 206, 208 so that the third and fourth sidewalls extend continuously between the first and second ends 232, 234 of sidewalls 206, 208 above slots 226. In one embodiment, the length L of slots 226 is greater than about 50% of the height H of the sidewalls, preferably approximately 60% to about 80% of the height H of sidewalls 206, 208. In another variation, the length L of slots 226 is approximately 65% to about 75% of the height H of sidewalls 206, 208. The width W of slots 226 may vary between about 20% of the length of the slots to about 50% of the length L of the slot, the foregoing dimensions being preferred to maintain the structural integrity of sidewalls 206, 208.

In the illustrated variation, slots 222 have the same dimensions as slots 226. In other variations, the dimensions of slots 222 may be different from the dimensions of slots 226. Slots 222 of cover section 200 have the same, or approximately the same, width as corresponding slots 122 of base section 100. Similarly, slots 226 have the same, or approximately the same, width as slots 126 of base section 100. In order to retain structural integrity of sidewalls 202-208, slots 222, 226 are configured to extend only partially though the height of the sidewalls such that a portion of each sidewall extends continuously from end-to-end above the slots.

Figure 3:
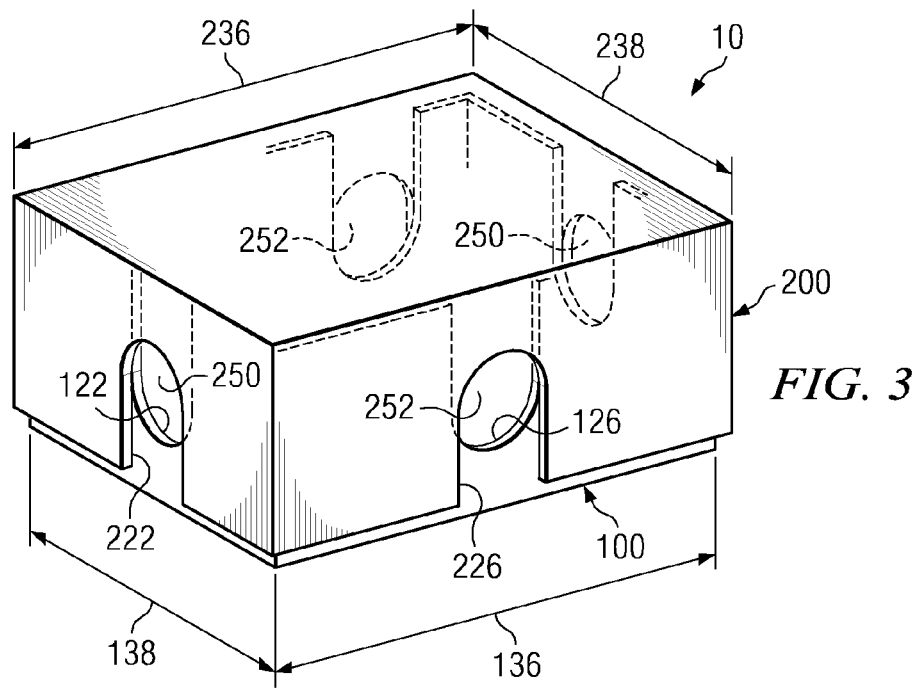
FIG. 3 is a perspective view of the assembled cover and base sections of FIGS. 1 and 2.

Referring to FIG. 3, the outside length 136 and width 138 of base section 100 is slightly less than the inside length 236 and 238 of cover section 200 so that the cover can be fitted over the base as illustrated in FIG. 3. Slots 122, 126 of base section 100 and slots 222, 226 of cover section 200 are positioned in sidewalls 102-108 and 202-208, respectively, such that the slots are aligned when the cover section is fitted over the base section. As illustrated, slots 222, 226 overlap slots 122, 126, respectively, and the respective lengths of the overlapping slots are selected such that when cover section 200 is fully fitted over base section 100 the intersecting portions of the slots define passageways 250, 252, respectively though which cables 260 may routed through enclosure 10. In one variation, slots 122, 126 and 222, 226 are formed with curved ends 142, 146 and 242, 246 such that passageways 250, 252 are generally oval or circular. In other variations, ends 142, 146 and 242, 246 may have triangular, square, or geometric configuration.

In one variation, there is exactly one slot 122 or 126 in each of sidewalls 102-108 of base section 100 and exactly one slot formed in each of sidewalls 202-208 of cover section 200. Each of slots 122 or 126 cooperates with exactly one of slots 222 or 226 to form passageways 250 or 252 when cover section 200 is fitted over base section 100. In this manner, exactly one passageway 250 or 252 is formed in each side of enclosure 10 with the top and bottom of the enclosure being entirely closed.

Figure 4:
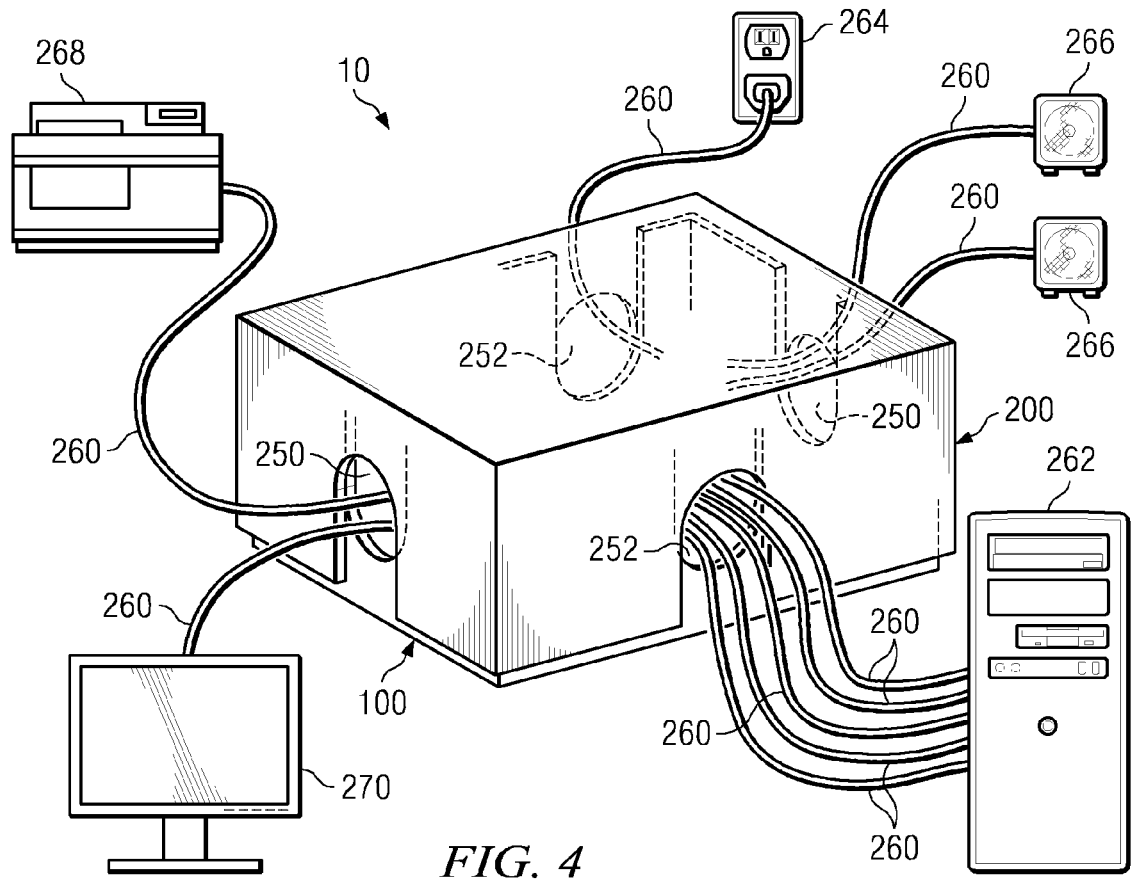
FIG. 4 is a partial perspective view of the enclosure of FIG. 3 wherein cables are routed through the enclosure.

FIG. 4 shows enclosure 10 employed with a computer 262. Cables 260 are routed through enclosure 10 to connect the computer to a power source 264, speakers 266, a printer 268, and a display device 270. Passageways 250, 252 permit cables to be routed through enclosure 10 with the slack portions of cables 260 are contained in the enclosure, rather than being strewn about in a haphazard manner. Passageways 250, 252 will have a minimum size or area when top wall 210 of cover section 200 is abutted against the top edge of one or more sidewalls 102-108 of base section 100. However, since cover section 200 floats or is moveable relative to base section 100, passageways 250, 252 can vary in height and size to accommodate a variable number of cables 260.

Figure 5:
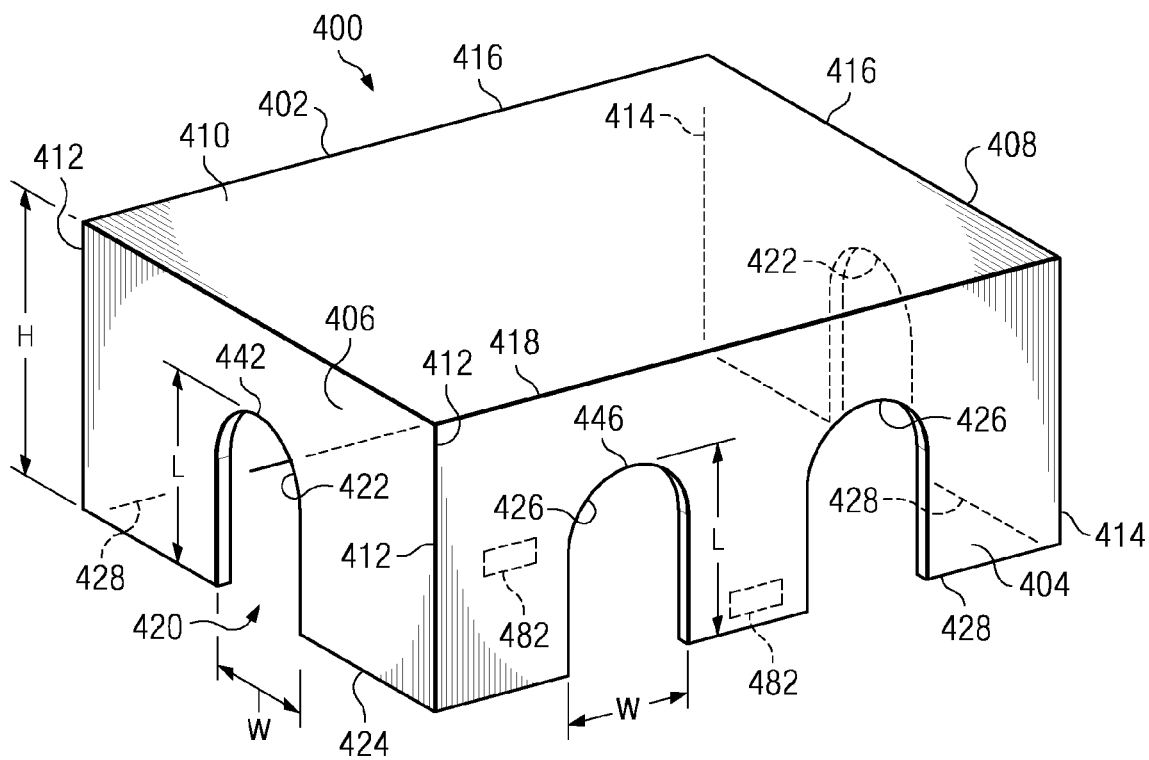
FIG. 5 perspective view of a cover section of a second slack cable enclosure according to the disclosure.
Figure 6:
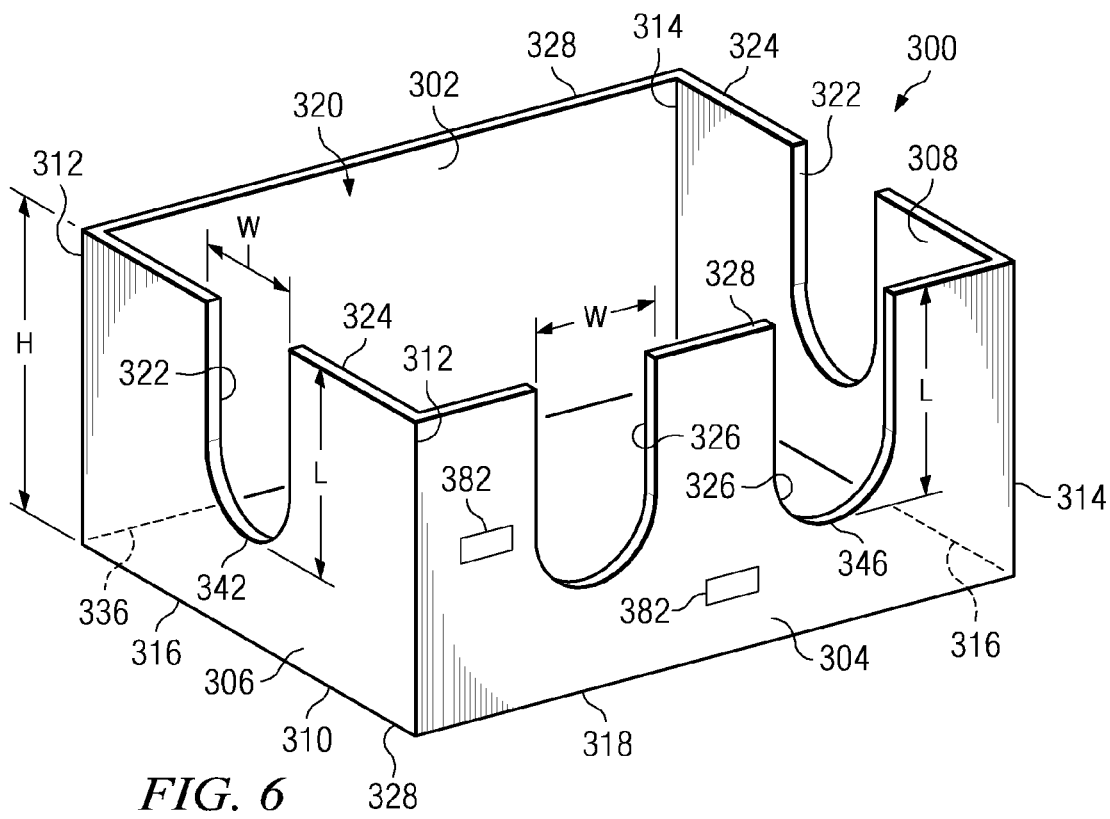
FIG. 6 is a perspective view of a second base section of a slack cable enclosure of according to the disclosure.

Turning to FIGS. 5-7, in another variation, an enclosure 20 for containing the slack portions of deployed cables includes a base section 300 and a removable cover section 400. As best shown in FIG. 6, base section 300 includes opposed first and second walls 302, 304, opposed third and fourth sidewalls 306, 308 and a bottom wall 310. First and second sidewalls 302, 304 are joined along first ends 312 to third sidewall 306 and along second ends 314 to fourth sidewall 308 along the height of the sidewalls. Sidewalls 302-308 are each joined along lower respective edges 316 to the edges 318 of bottom wall 310 to form a generally rectangular enclosure having an open side 320.

Referring still to FIG. 6, base section 300 has opposed first open-ended slots 322 formed in opposed third and fourth sidewalls 306, 308 approximately midway along the length of each of the sidewalls. Each of opposed slots 322 extends through the upper edges 324 of third and fourth sidewalls 306, 308 toward bottom wall 310 and preferably has a length L greater than its width W. The length L of slots 322 is less than the height H of third and fourth sidewalls 306, 308 such that the third and fourth sidewalls extend continuously from endto-end beneath slots 322. In one embodiment, slots 322 extend over half the height of sidewalls 306, 308.

In one variation, second side wall 304 has a plurality of spaced apart open ended second slots 326 formed along the length of the sidewall that extend through the upper edge 328 toward the bottom wall 310. Second slots 326 preferably have a length L greater than width W with the length L of the slots less than the height H of the second sidewall 304 so that the second sidewall extends continuously between the first and second ends 312, 314 of the sidewall beneath slots 326. In one embodiment, slots 326 extend over half the height of sidewall 304. In one variation, two second slots 326 are spaced at approximately equal intervals along the length of second sidewall 304.

Slots 322, 326 permit a user to route one or more cables into and out of base section 300 when cover section 400 is removed without disconnecting the cable from connected devices. Slack portions of the cables are stored inside base section 300. In one variation, slots 322, 326 have the same dimensions. However, in other variations, slots 322 may have dimensions different from slots 326. In order to retain structural integrity of sidewalls 304-308, open-ended slots 322, 326 are configured to extend only partially though the height of the sidewalls such that a portion of each sidewall extends continuously from end-to-end beneath the slots.

As best illustrated in FIG. 5, cover section 400 includes opposed first and second walls 402, 404, opposed third and fourth sidewalls 406, 408 and a top wall 410. First and second sidewalls 402, 404 are joined along first ends 412 to third sidewall 406 and along second ends 414 to fourth sidewall 408 along the height of the sidewalls. Sidewalls 402-408 are each joined along upper edges 416 to the edges 418 of top wall 410 to form a generally rectangular enclosure having an open side 420.

Cover section 400 has opposed first slots 422 formed in opposed third and fourth sidewalls 406, 408 approximately midway along the length of each of the sidewalls. Each of opposed slots 422 extends through the lower edges 424 of third and fourth sidewalls 406, 408 toward top wall 410 and preferably has a length L greater than its width W. The length L of slots 422 is less than the height H of third and fourth sidewalls 406, 408 such that the third and fourth sidewalls extend continuously from end-to-end above slots 422.

Second sidewall 404 has a plurality of spaced apart second slots 426 formed along the length of the sidewall that extend through lower edge 428 toward top wall 410. Second slots 426 preferably have a length L greater than width W with the length L of the slots less than the height H of second sidewall 404 so that the second sidewall extends continuously from end-to-end between the first and second ends 412, 414 of the sidewall above slots 426 to maintain the structural integrity of the sidewall. Slots 422 may have the same or different dimensions as slots 426. In one variation, slots 422 of cover section 400 have the same, or approximately the same, width as corresponding slots 322 of base section 300. Similarly, slots 426 have the same, or approximately the same, width as slots 326 of base section 300. In the illustrated variation, exactly two spaced-apart slots 426 are formed in second sidewall 404.

Referring now to FIG. 7, the outside length 336 and width 338 of base section 300 is slightly less than the inside length 436 and 438 of cover section 400 so that the cover can be fitted over the base. Slots 322, 326 of base section 300 and slots 422, 426 of cover section 400 are positioned in sidewalls 304, 306 and 308 and 404, 406, and 408, respectively, such that the slots are aligned when the cover section is fitted over the base section. As illustrated, slots 422, 426 overlap slots 322, 326 when cover section 400 is fitted over base section 300 to form passageways 350, 352, respectively though which cables may be routed through the base section 300. Slots 322, 326 and 422, 426 are formed with curved ends 342, 346 and 442, 446 such that passageways 350, 352 are generally oval or circular. In other variations, ends 342, 346 and 442, 446 may be triangular, square or another geometric configuration. As best illustrated in FIG. 6, in one variation, cover section 400 is dimensioned so that the bottom edges 424, 428 of sidewalls 404-406 are level or horizontally aligned with the lower ends 342, 346 of slots 322, 326 of base section 300 when the cover is fully seated on the base section.

In one variation, there is exactly one slot 322 in each of third and fourth sidewalls 306-308 of base section 300 and exactly two slots 326 formed in second sidewall 304 of the base section. In this variation, there is exactly one slot 422 formed in each of third and fourth sidewalls 406, 408 of cover section 400 and exactly two slots formed in second sidewall 404 of the cover section. Slots 322 and 326 are positioned to align with slots 422 and 426 when cover section 400 is fitted over base section 300 to form passageways 350, 352 when cover section 400 is fitted over base section 300. In this manner, exactly one passageway 350 is formed by sidewalls 306 and 406, one by sidewalls 308 and 408, and exactly two passageways are formed by sidewalls 304, 404, with the top and bottom of the enclosure 20 being entirely closed. In one variation, the side of enclosure 20 corresponding to first sidewalls 302, 402, is also completely closed.

Referring still to FIG. 7, in order to releasably secure cover 400 on base 300, latch mechanisms 380 are disposed between sidewalls 302, 402 and 304, 404. As best shown in FIGS. 5 and 6, each of latch mechanisms 380 includes a first component 382 attached to or formed on the outside surface of each of sidewalls 302, 304 of base section 300 and a second component 482 formed or attached to the inside surfaces of sidewalls 402, 404 of cover section 400. Components 382, 482 are positioned on the surfaces of sidewalls 302, 304 and 402, 404, respectively, such that the components are aligned when cover section 400 is fitted over base section 300. When cover section 300 is placed over base section 400, components 482 engage components 382 to releasably retain the cover section on the base section.

Figure 11:
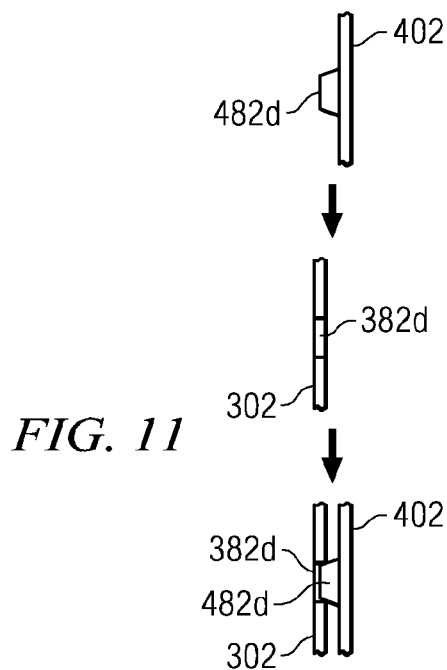

FIG. 8 illustrates ridge-shaped components 382a, 482a that slide over each other when cover 400 is placed over base 300. FIG. 9 shows tooth-shaped components 382b, 482b having inclined surfaces that facilitate engagement of the components when cover 400 is placed over base 300. FIG. 10 illustrate semi-cylindrical components 382c, 482c that slide over each other when cover 400 is placed over base 300 or removed from base 300. In another variation, illustrated in FIG. 11, second components 482 comprises protrusions 482(d) that engage and disengage apertures 382(d) when cover section 400 is fitted over or removed from base section 300. In the illustrated embodiment, latching mechanism 380 is disposed between exactly two sets of opposed sidewalls 302, 402, and 304, 404. In other variations, latching mechanisms 380 may be disposed between one, two, three, or four sets of opposed sidewalls of base and cover sections 300, 400.

Figure 12:
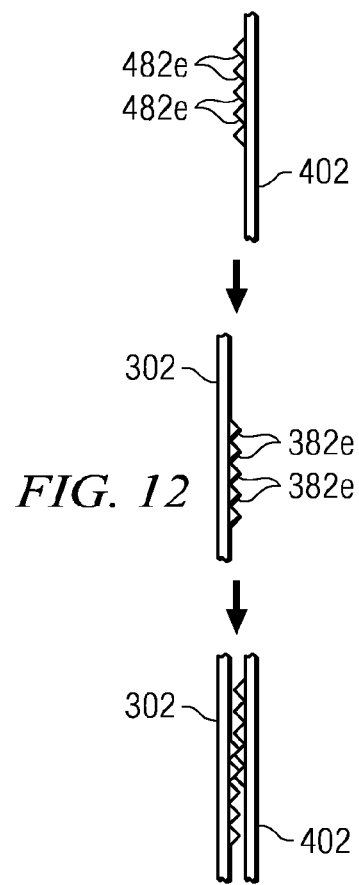
Figure 13:
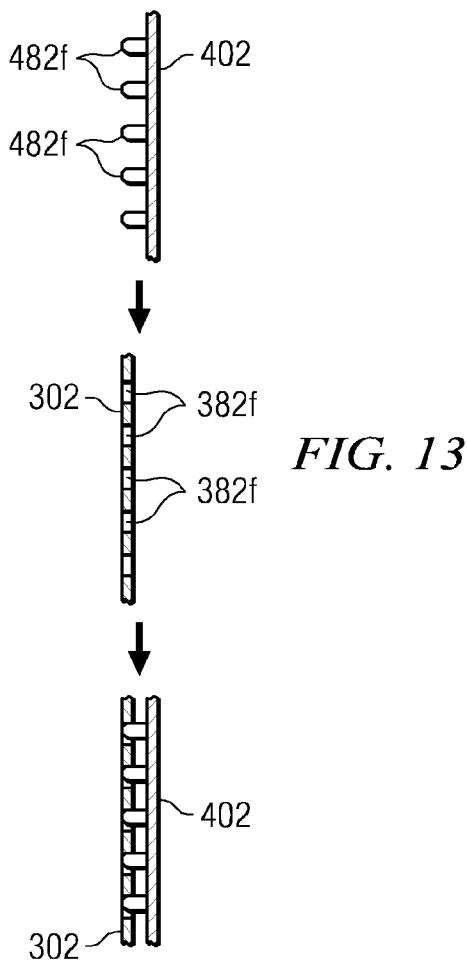

As shown in FIG. 12, in yet another variation, latching mechanism 380 comprises opposing racks of teeth or projections 382e, 482e that engage each other when cover section 400 is placed over base section 300. In this embodiment, latching mechanism 380 may be engaged over a range of distance corresponding to different positions or heights of cover section 400 on base section 300. Similarly, as illustrated in FIG. 13, latching mechanism 380 may include a series of protrusions 482f formed on the inside surface of sidewall 402 that engage one or more of a series of apertures 382f formed on the outside surface of sidewall 302. In the variations illustrated in FIGS. 12 and 13, cover section 400 may be placed over base section 300 to vary the size of passageways 350, 352, permitting the size of the passageway to be adjusted to accommodate a greater or lesser number of cables to be routed through enclosure 20 while maintaining the size of passageways 350, 352 at a minimum to minimize the ingress of dust and debris into enclosure 20.

Figure 14:
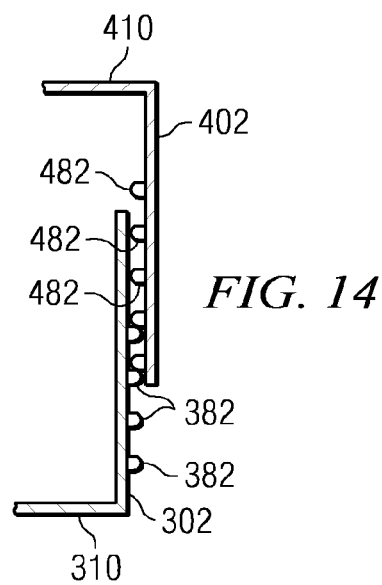

In many instances, when slack lengths of a cable or cables are placed in base 300, loops or sections of the slack cable will extend or protrude upward beyond the height of sidewalls 302-308. Such loops or sections tend to push upward against cover section 400, preventing the cover from remaining fully engaged with base section 300. When a user pushes cover section 400 down against protruding loops of slack cable, latch mechanisms 380 engage, holding the cover section in position on the base section. In one variation, latch mechanisms 380 are positioned adjacent the lower edges of one or more of sidewalls 402-408. In another variation, latch mechanisms 380 are positioned such that the inside surface of top wall 410 of cover 400 is proximate to, or abuts the upper edges of one or more of sidewalls 302-308 of base section 300 when first and second latch components 382, 482 are engaged. In another variation, shown in FIG. 14, multiple latch components 382, 482 are placed at different elevations on one or more sidewalls such that cover section 400 may be secured on base section 300 at different elevations relative to the base section. Thus, the height and size of passageways 350, 352 may be varied by positioning cover section 400 at different elevations on base section 300.

Turing to FIGS. 15 and 16, in one variation, one or more of slots 322, 326 in base section 300 is defined by means of perforations 372, 376 extending through sidewalls 304, 306 and 308. Likewise, slots 422, 426 in cover section 400 are defined with perforations 472, 476 extending through sidewalls 304, 306 and 308. In order to create the desired selected passageways 350, 352, the user removes one or more of perforated sections 392, 396 from sidewalls 304-308 of base section 300 and the corresponding perforated sections 492, 496 from sidewalls 404-408 of cover section 400. In this manner, the user can open selected ones of passageways 350, 352 while leaving other perforated sections 392, 396, 492 and 496 in place. This feature eliminates unwanted openings in enclosure 20, preventing dust and other debris from entering the enclosure. As in the case of enclosure 10, base section 300 and cover section 400 of enclosure 20 may be constructed from plastic, wood, cardboard, sheet metal, and other appropriate materials.

Turning to FIGS. 18-21, in yet another variation, an enclosure 30 comprises a base section 500 and a cover section 600. As best illustrated in FIG. 17, base section 500 has opposed first slots 522 formed in opposed third and fourth sidewalls 506, 508 approximately midway along the length of each of the sidewalls. Each of opposed open-ended slots 522 extends through the upper edges 524 of third and fourth sidewalls 506, 508 toward bottom wall 510 and preferably has a length greater than its width. The length of slots 522 is less than the height of third and fourth sidewalls 506, 508 such that the third and fourth sidewalls extend continuously from end-to-end beneath slots 522 to maintain the structural integrity of the sidewall.

Second side wall 504 has a plurality of spaced apart second open ended slots 526 formed along the length of the sidewall that extend through the upper edge 528 toward the bottom wall 510. Second slots 526 preferably have a length greater than width with the length of the slots less than the height of the second sidewall 504 so that the second sidewall extends continuously between first and second ends 512, 514 of the sidewall beneath slots 526. In the illustrated embodiment, two second slots 526 are spaced at approximately equal intervals along the length of second sidewall 504 between ends 512, 514. In other variations, slots 526 may be placed closer to ends 512, 514 of sidewall 504 or closer to the middle of the sidewall.

As best shown in FIGS. 17 and 18, base section 500 is provided with brackets or frames 562 around the periphery of one or more of slots 522, 526. In the illustrated embodiment, frames 562 extend outwardly from sidewalls 504-508, however, in other configurations frames 560 may comprise grooves or recesses in the sidewalls extending around the periphery of one or more of slots 522, 526. Frames 562 are adapted to receive a lower portion of blanks 564 so as to close slots 522, 526 when cover section 600 is fitted over base section 500.

Figure 19:
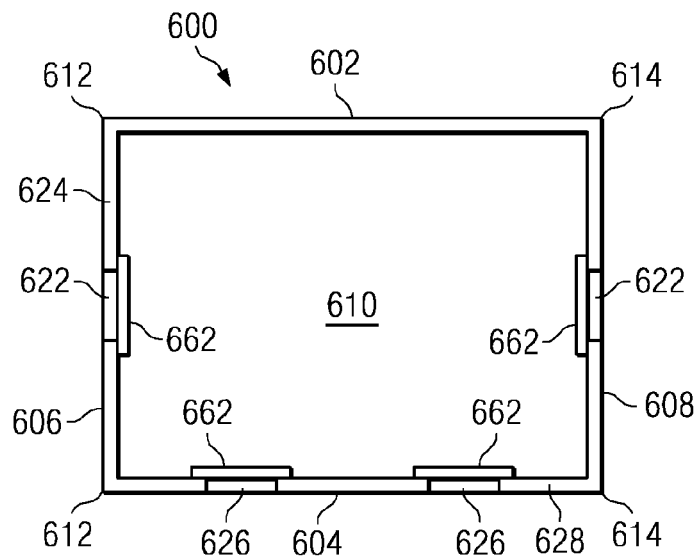
FIG. 19 is a bottom view of the cover section of the enclosure of FIG. 18.

Turning to FIGS. 17 and 19, cover section 600 has opposed open-ended first slots 622 formed in opposed third and fourth sidewalls 606, 608 approximately midway along the length of the sidewalls. Each of opposed slots 622 extends through the lower edges 624 of third and fourth sidewalls 606, 608 toward top wall 610 and preferably has a length greater than its width. The length of slots 622 is less than the height of third and fourth sidewalls 606, 608 such that the third and fourth sidewalls extend continuously from end-to-end above slots 622.

Second sidewall 604 has a plurality of spaced apart second slots 626 formed along the length of the sidewall that extend through lower edge 628 toward top wall 610. Second slots 626 preferably have a length greater than width with the length of the slots less than the height of second sidewall 604 so that the second sidewall extends continuously between the first and second ends 612, 614 of sidewall 604 above slots 626 to maintain the structural integrity of the sidewall.

Figure 20:
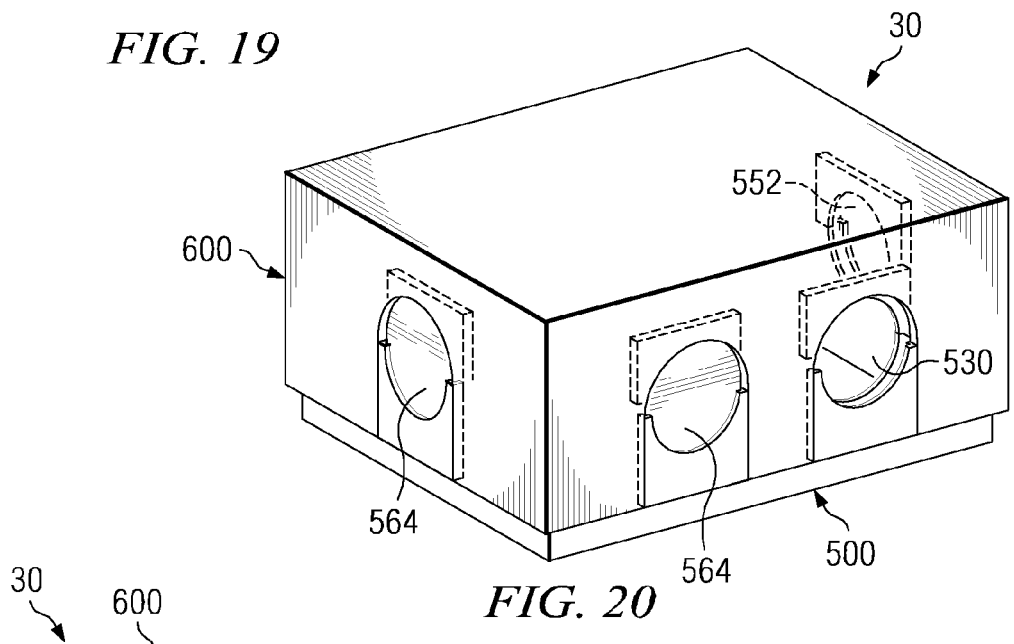
FIG. 20 is a perspective view of the enclosure of FIG. 18.
Figure 21:
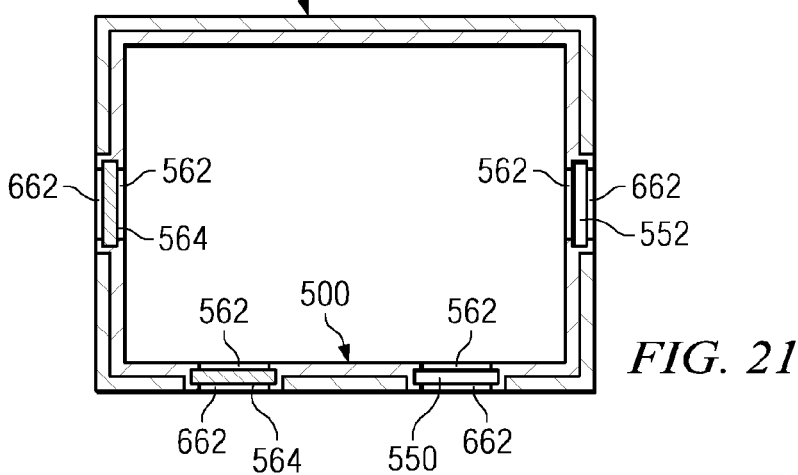
FIG. 21 is a sectional view of the enclosure of FIG. 20.

As best illustrated in FIGS. 20 and 21, slots 622, 626 overlap slots 522, 526 when cover section 600 is fitted over base section 500 to form passageways 550, 552, respectively, though which cables may be routed through the base section 500. Cover section 600 is also provided with brackets or frames 662 around the periphery of one or more of slots 622, 626. Frames 662 are adapted to receive an upper portion of blanks 564 when cover section 600 is placed over base section 500. In the illustrated embodiment, frames 562 extend around the lower portions of slots 522, 522 and frames 662 extend around the upper portions 662 of slots 622, 626 such that the frames 562, 662 do not contact or interfere with each other when cover 600 is placed over base 500 as illustrated in FIGS. 20 and 21. In another variation, frames 662 are dimensioned slightly larger than brackets 562 such that frames 662 can slide over frames 552.

Frames 562, 662 and blanks 564 are dimensioned to cover and close passageways 550, 552 when cover section 500 is fitted over base section 600. Brackets 562, 662 and blanks 564 provide a means of closing unused passages 550, 552 to prevent dust and debris from entering enclosure 30 as well as for aesthetic reasons. Blanks 564 may be formed from the same or different materials as base 500 and/or cover section 600. Blanks 564 may be formed form a transparent material to provide the user with means for viewing the inside of enclosure 20 or may be made from a translucent or opaque material.

Figure 22:
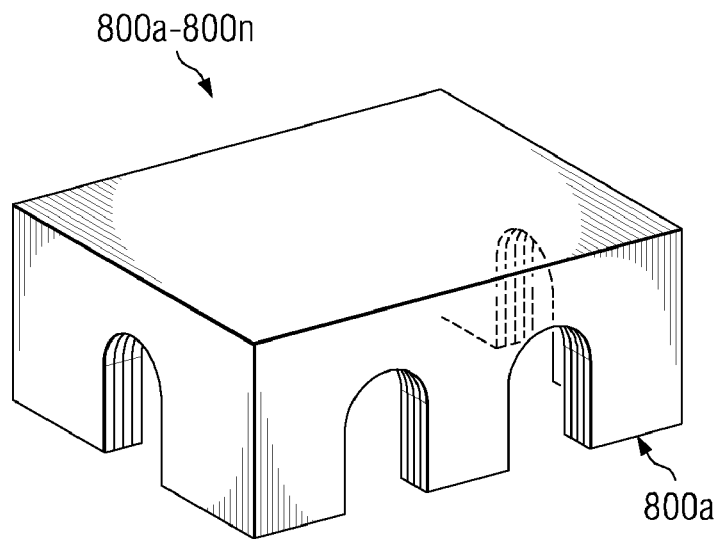
FIG. 22 is a partial perspective view of a series of nested cover sections of enclosures according to the disclosure.
Figure 24:
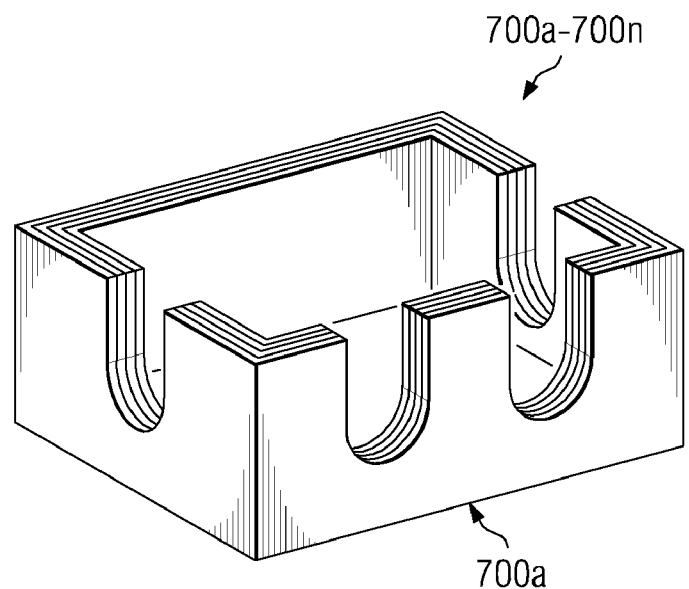
FIG. 24 is a partial perspective view of a series of nested base sections of enclosures according to the disclosure.
Figure 23:
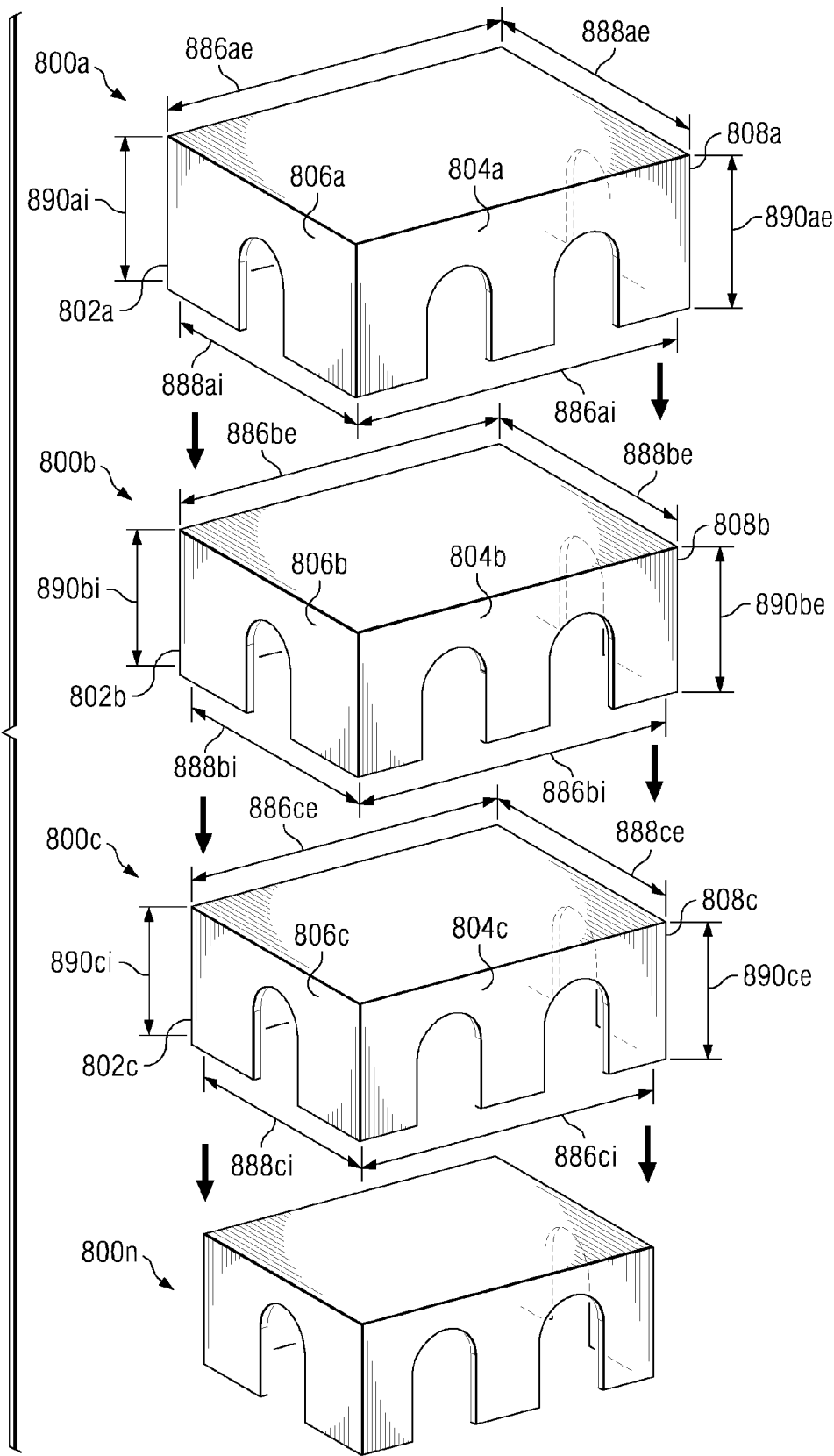
FIG. 23 is an exploded view of the series of nested cover sections of FIG. 22.

Turning to FIGS. 22-24, in one variation, enclosures 10, 20 and 30 and other enclosures according to the disclosure may be formed from a plurality of nested cover sections 700a, 700b, 700c . . . 700n and nested base sections 800a, 800b, 800c . . . 800n. Cover sections 700 and base sections 800 may be constructed the same as cover and base sections 100 and 200, 300 and 400, as well as base and cover sections 500 and 600, and may incorporate some or all of the features described in connection therewith.

Figure 25:
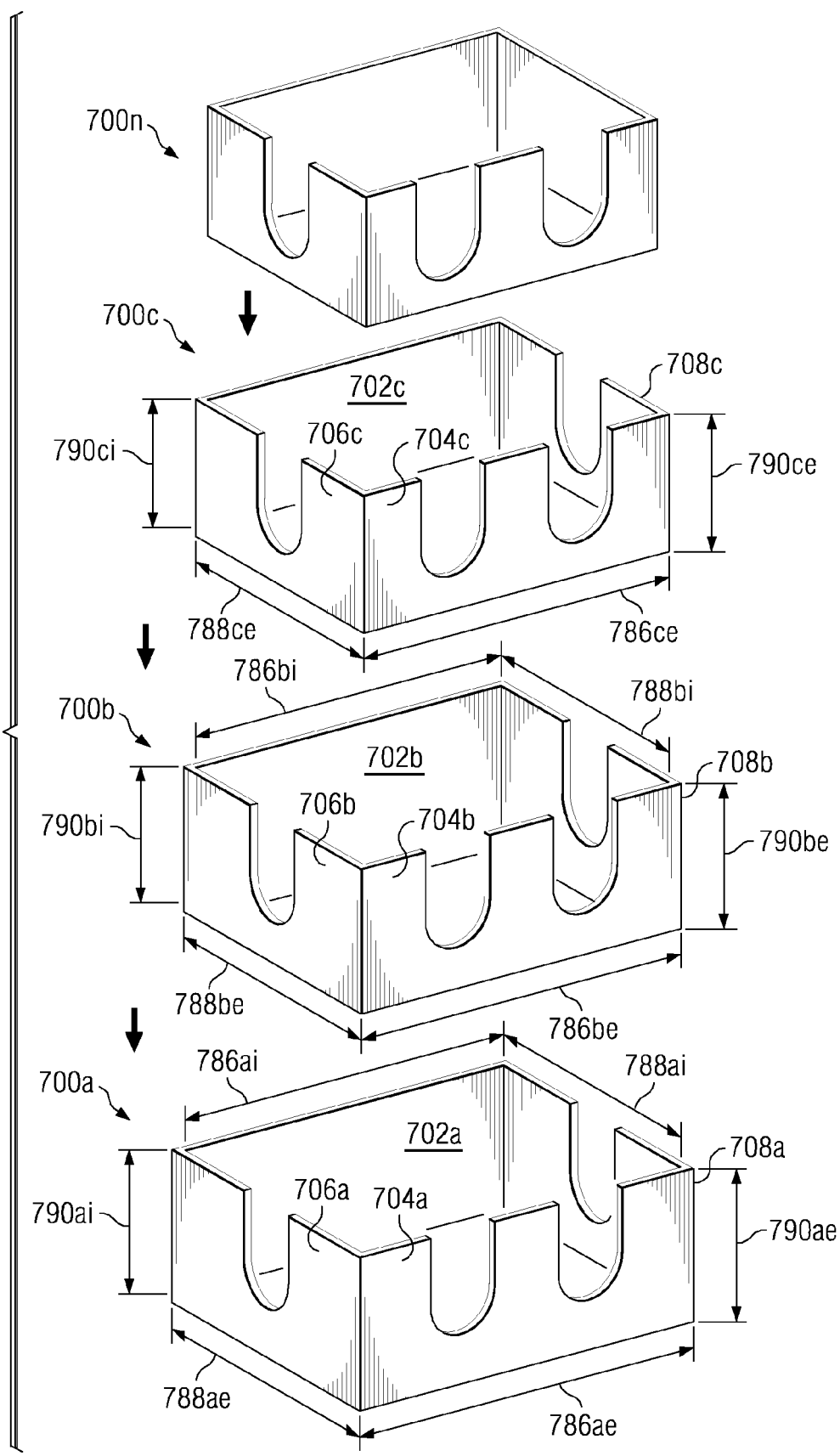
FIG. 25 is an exploded view of the series of nested base sections of FIG. 24.

Turning first to FIGS. 24 and 25, as illustrated, base section 700a has an interior length 786ai between sidewalls 706a and 708a and an interior width 788ai between sidewalls 702a and 704a that are slightly greater than the exterior length 786be and exterior width 788be between sidewalls 706b, 708b and 702b, 704b of base section 700b. In this manner, base section 700b may be placed in or "nested" in base section 700a. In one embodiment, the interior height 790ai of base section 700a is the same as, or slightly greater than, the exterior height 790be of base section 700b. In this variation, the top edges of sidewalls 702b-708b are flush, or even with, the top edges of sidewalls 702a-708a, when base section 700b is nested in base section 700a.

Likewise, base section 700b has an interior length 786bi between sidewalls 706b and 708b and an interior width 786bi between sidewalls 702b and 704b that is slightly greater than the exterior length 786ce and exterior width 788ce between sidewalls 706c, 708c and 702c, 704c of base section 700c. In this manner, base section 700c may be nested in base section 700b. In an embodiment where the interior height 790bi of base section 700b is selected to be the same as, or slightly greater than, the exterior height 790ce of base section 700c, the top edges of sidewalls 702b-708b will be even with the top edges of sidewalls 702c-708c. Additional base sections 700n (where n denotes a number of additional, sequentially nested base sections) may be nested in like fashion wherein the exterior dimensions 786ne, 788ne and 790ne of each nested base section are slightly smaller that the interior dimensions 786(n-1)i, 788(n-1)i and 790(n-1)i of the nesting section. In this manner, the desired number of sections 700a-n are fitted into a volume equal to the product of exterior length 786ae, exterior width 788ae and exterior height 790ae of base section 700a.

As used herein, the terms "slightly smaller" and "slightly greater" refer to differences in dimensions sufficient to allow a cover section such as cover section 200 to be fitted over base section 100 or to allow a base section 700b to be nested in base section 700a with a minimal gap or clearance between the walls of the cover and base section or between the walls of the nested sections. Such differences in dimensions will be, for example from about 1/32 inch to about 5/16 inch.

Turning now to FIGS. 22 and 23, in one variation, cover section 800a has an interior length 886ai between sidewalls 806a and 808a and an interior width 888ai between sidewalls 802a and 804a that are slightly greater than the exterior length 886be and exterior width 888be between sidewalls 806b, 808b and 802b, 804b of cover section 800b. In this manner, cover section 800b may be placed in or "nested" in cover section 800a. In one embodiment, the interior height 890ai of cover section 800a is the same as, or slightly greater than, the exterior height 890be of cover section 800b. In this variation, the bottom edges of sidewalls 802b-808b are flush, or even with, the bottom edges of sidewalls 802a-808a, when cover section 800b is nested in cover section 800a.

Referring still to FIG. 23, cover section 800b has an interior length 886bi between sidewalls 806b and 808b and an interior width 886bi between sidewalls 802b and 804b that are slightly greater than the exterior length 886ce and exterior width 888ce between sidewalls 806c, 808c and 802c, 804c of cover section 800c. In this manner, cover section 800c may be nested in cover section 800b. In an embodiment where the interior height 890bi of cover section 800b is selected to be the same as, or slightly greater than, the exterior height 890ce of cover section 800c, the bottom edges of sidewalls 802b-808b will be even with the bottom edges of sidewalls 802c-808c. Additional cover sections 800n (where n denotes a number of additional, sequentially nested cover sections) may be nested in like fashion wherein the exterior dimensions 886ne, 888ne and 890ne of each nested cover section are slightly smaller that the interior dimensions 886(n-1)i, 888(n-1)i and 890(n-1)i of the nesting section. Thus, the desired number of sections 800a-n is fitted into a volume equal to the product of exterior length 886ae, exterior width 888ae, and exterior height 890ae of cover section 800a.

Nesting base and cover sections 700, 800 as described above allows a number of enclosures 10, 20 or 30 to be packaged in a minimal volume. Although the enclosures in a nested group will have slightly different dimensions from one another, they will be functionally equivalent. This feature allows reduced shipping and storage costs as compared to shipping and storing individual enclosures. This feature also permits a group of enclosures 10, 20, or 30 to be packaged together for marketing and sales purposes. In this regard, it will be understood that in one embodiment, each of cover sections 800a . . . 800n is dimensioned to fit over a corresponding base section 700a . . . 700n to form an enclosure such as enclosure 10, 20, 30 or 40 (described below).

Figure 26:
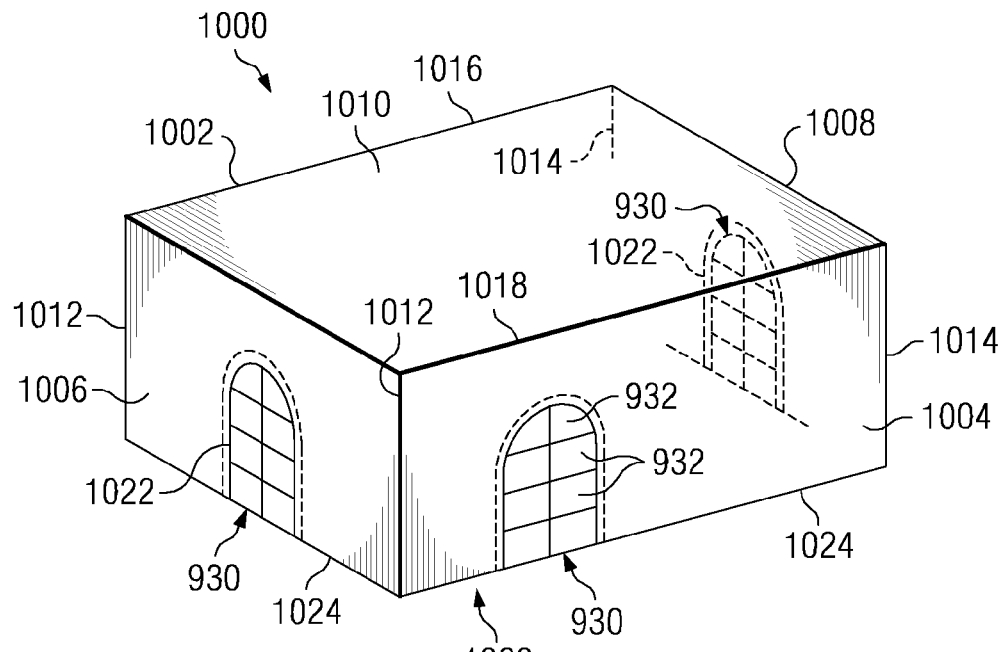
FIG. 26 is a perspective view of a cover section yet another enclosure of the disclosure.
Figure 27:
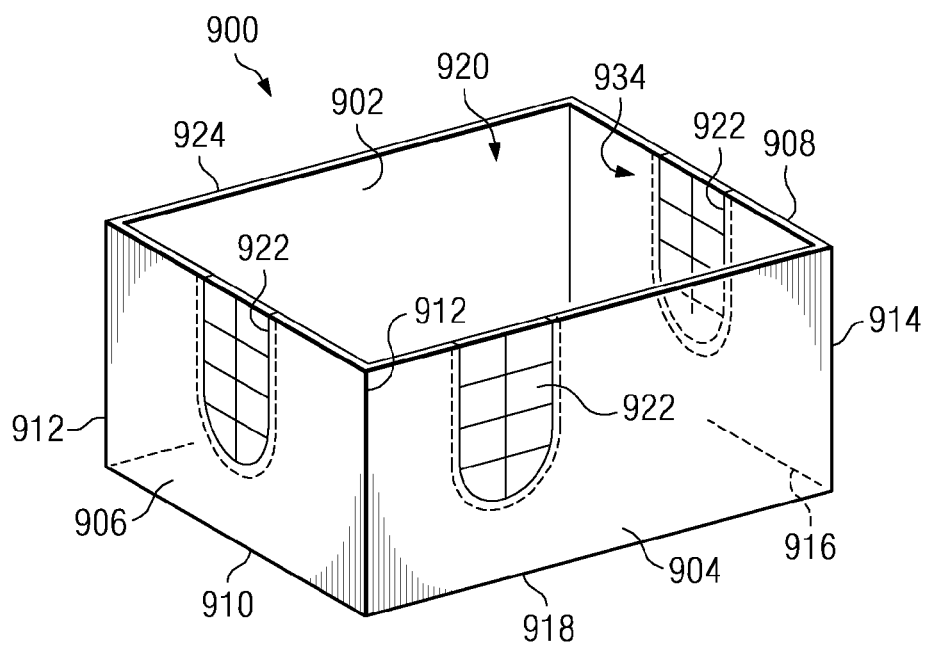
FIG. 27 is a perspective view of a base section of yet another enclosure of the disclosure.

Referring to FIGS. 26-29, in yet another variation, an enclosure 40 for storing cable slack includes base and removable cover sections 900 and 1000, respectively. As best illustrated in FIG. 27, base section 900 includes opposed first and second walls 902, 904, opposed third and fourth sidewalls 906, 908 and a bottom wall 910. First and second sidewalls 902, 904 are joined along first ends 912 to third sidewall 906 and along second ends 914 to fourth sidewall 908 along the height of the sidewalls. Sidewalls 902-908 are each joined along lower respective edges 916 to the edges 918 of bottom wall 910 to form a generally rectangular enclosure having an open side 920.

As best illustrated in FIG. 27, base section 900 has open-ended slots 922 formed in second, third and fourth sidewalls 904-908. While as illustrated, slots 922 are located generally midway along the length of sidewalls 904-908, the slots may be otherwise located along the length of the sidewalls. Each of slots 922 extends through the upper edges 924 sidewalls 904-908 toward bottom wall 910. The length of each of slots 922 is preferably less than the height of sidewalls 904-908 such that the sidewalls extend continuously from end-to-end beneath slots 922.

Turning to FIG. 26, cover section 1000 includes opposed first and second walls 1002, 1004, opposed third and fourth sidewalls 1006, 1008 and a top wall 1010. First and second sidewalls 1002, 1004 are joined along first ends 1012 to third sidewall 1006 and along second ends 1014 to fourth sidewall 1008 along the height of the sidewalls. Sidewalls 1002-1008 are each joined along upper edges 1016 to the edges 1018 of top wall 1010 to form a generally rectangular enclosure having an open side 1020.

As illustrated, cover section 1000 has first open-ended slots 1022 formed in sidewalls 1004-1008. While as illustrated, slots 1022 are located approximately midway along the length of each of the sidewalls 1004-1008; the slots may be located at other positions along the sidewalls corresponding to the location of slots 922 of base 900. For example, one or more of slots 1022 may be formed adjacent the corners of the cover section with the corresponding slots 922 of base section 900 similarly positioned. Each of slots 1022 extends through the lower edges 1024 of sidewalls 1004-1008. The length of slots 1022 is less than the height of first and second sidewalls 1004-1008 such that the first and second sidewalls extend continuously from end-to-end above slots 1022.

In the illustrated variation, slots 922 have approximately the same dimensions. Likewise, in the illustrated embodiment, slots 1022 have approximately the same dimensions. However, in other variations, slots 922 may have varying dimensions as may slots 1022. Slots 1022 of cover section 1000 have the same, or approximately the same, width as corresponding slots 922 of base section 1000.

Figure 28:
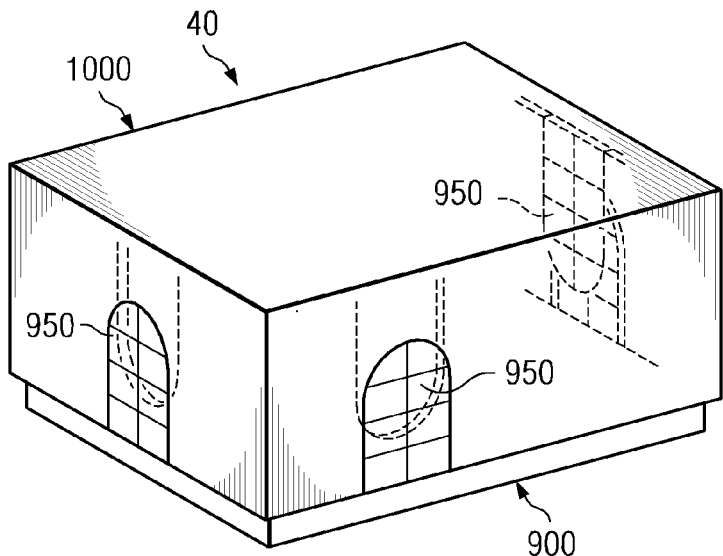
FIG. 28 is a perspective view of the assembled cover and base sections of FIGS. 26 and 27.

Base section 900 and cover section 1000 are dimensioned such that the cover may be fitted over the base as illustrated in FIG. 28. As illustrated, slots 922 and 1022 are dimensioned and positioned such that slots 1022 overlaps slots 922 when cover section 1000 is fitted over the base section. As illustrated, the overlapping portions of slots 1022 and 922 form passageways 950 through sidewalls 904-908 and 1004-1008 through which cables may be routed with slack portions of the cables stored inside enclosure 40.

Figure 29:
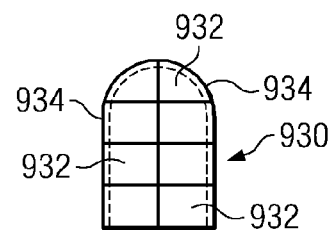
FIG. 29 is a front view of a slot cover or curtain of the base and cover sections of FIG. 27.

As illustrated, each of slots 922, 1022 is provided with a curtain 930 that cover passageways 950 when cover section 1000 is fitted over base section 900. As best shown in FIG. 29, in one embodiment, curtains 930 comprise a sheet of resilient flexible material divided into connected segments 932. Curtains 930 close off openings 950 when the openings are not in use with segments 932 flexing to the sides when cables are routed through the openings. Although as illustrated, curtains 930 are provided for slots 922 of base section 900, it may be desirable to provide curtains 930 only for slots 1022 of cover section 1000 or vice versa since it may be possible to close a passageway 950 with a single curtain positioned over one of the slots 922, 1022 forming the particular passageway.

Preferably, curtains 930 are formed from a material such as a flexible plastic or elastomer that is sufficiently resilient to return to the closed position when the cables are removed. In one embodiment, curtains 930 are attached to sidewalls 904-908, 1004-1008 along a perimeter 934 of the curtains with staples, glue, or other suitable attachment means. In another variation, curtains 934 are integrally formed with sidewalls 904-908, 1004-1008, for example by a reduced thickness plastic sidewall area that is cut to form segments 932. Curtains 930 serve to prevent ingress of dust, debris, and insects when openings 950 are not in use.

In the illustrated variation, there is exactly one slot 922 formed in each of sidewalls 904-908 of base section 900 and exactly one slot 1022 formed in each of sidewalls 1004-1008 of cover section 1000 to form exactly one passageway 950 through each of sidewalls 904-908 and sidewalls 1004-1008. As illustrated, enclosure 40 is entirely closed except for passageways 950. In another variation, there is exactly one slot 922 formed in each of sidewalls 906 and 908 of base section 900 and exactly two slots 922 formed in side wall 906. In this variation, exactly one slot is formed in sidewalls 1006, 1008 of cover section 1000 and exactly two slots formed in sidewall 1004, forming exactly one passageway 950 through each of sidewalls 904, 908, 1004, 1008 and exactly two passageways 950 through sidewalls 906, 1006.

Figure 30:
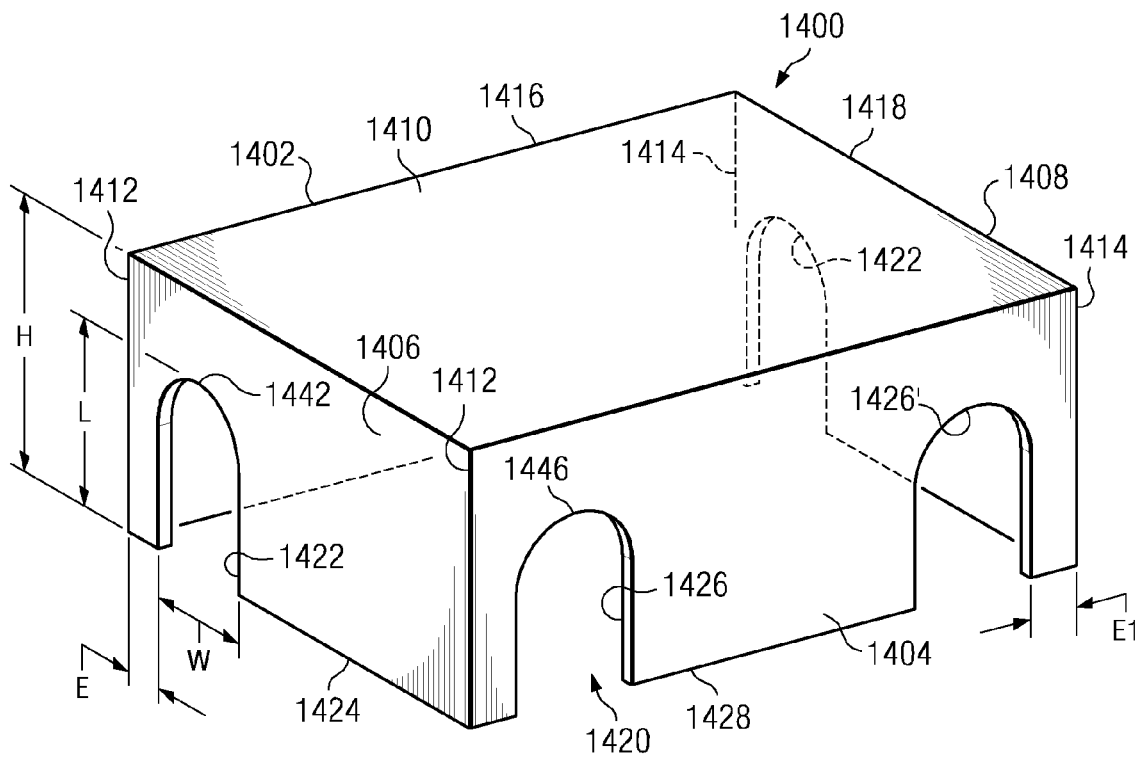
FIG. 30 is a perspective view of a cover section of another enclosure according to the disclosure.
Figure 31:
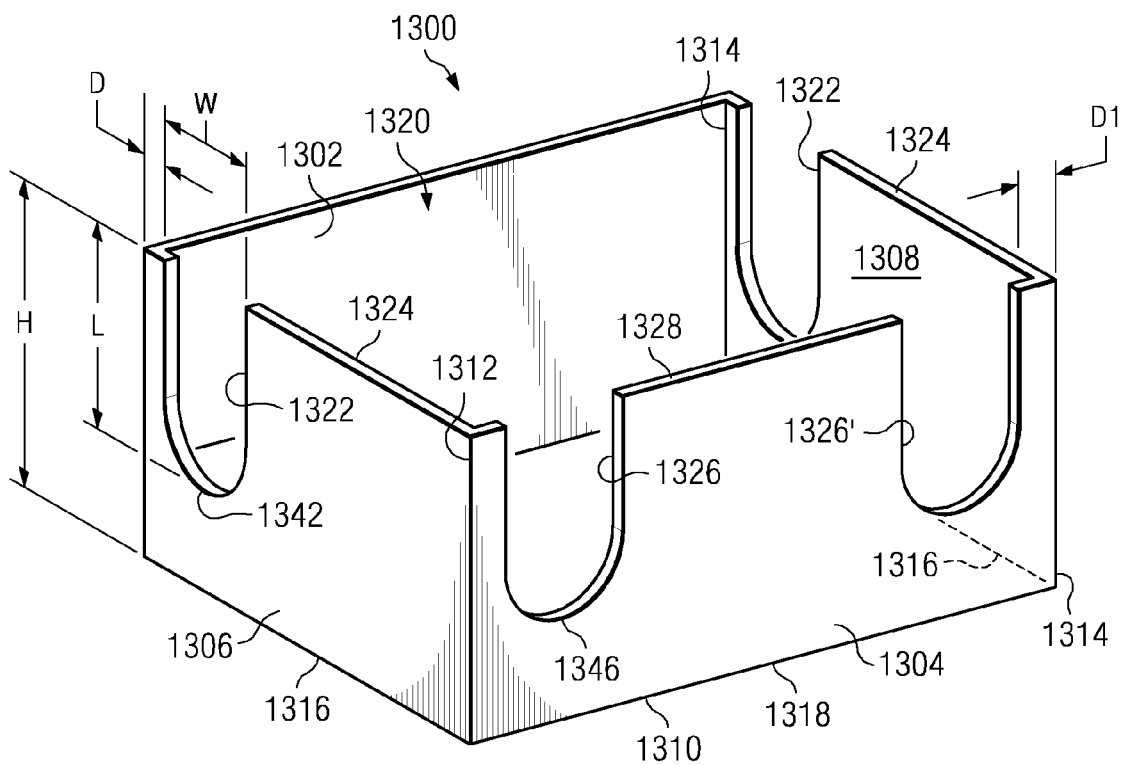
FIG. 31 is a perspective view of a base section of another enclosure according to the disclosure.
Figure 32:
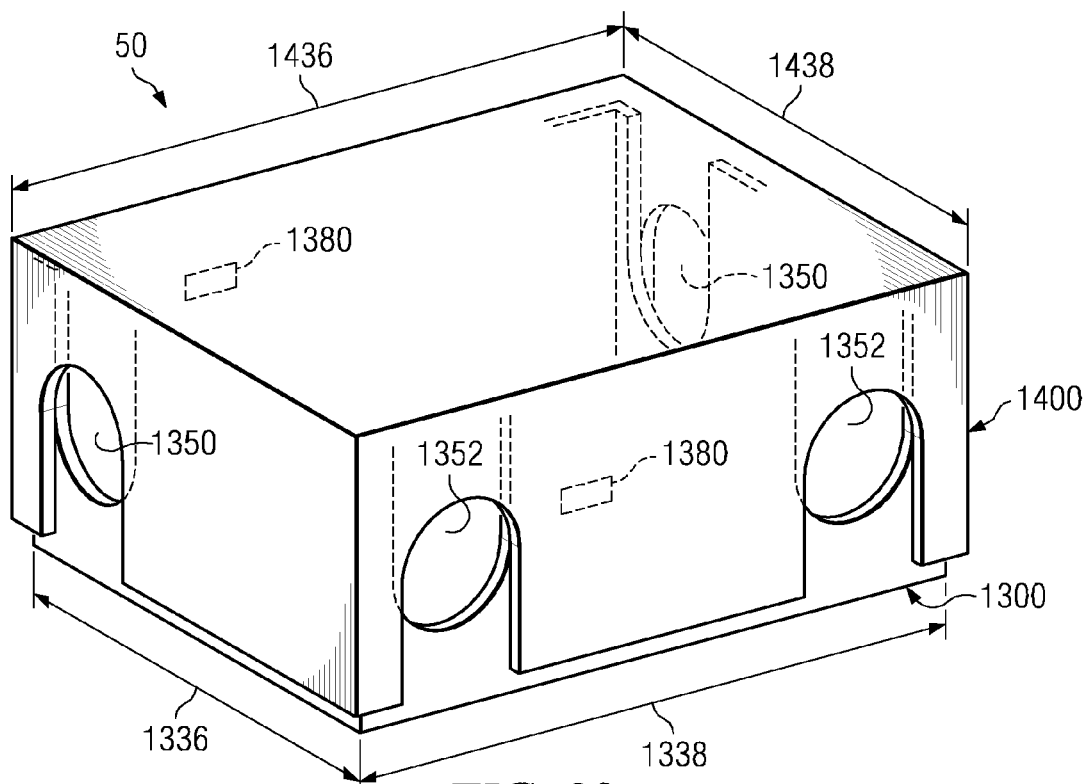
FIG. 32 is a perspective view of the assembled cover and base sections of FIGS. 30 and 31.

Turning to FIGS. 30-32, in another variation, an enclosure 50 for containing the slack portions of deployed cables includes a base section 1300 and a removable cover section 1400. As best shown in FIG. 31, base section 1300 includes opposed first and second walls 1302, 1304, opposed third and fourth sidewalls 1306, 1308 and a bottom wall 1310. First and second sidewalls 1302, 1304 are joined along first ends 1312 to third sidewall 1306 and along second ends 1314 to fourth sidewall 1308 along the height of the sidewalls. Sidewalls 1302-1308 are each joined along lower respective edges 1316 to the edges 1318 of bottom wall 1310 to form a generally rectangular enclosure having an open side 1320.

Referring still to FIG. 31, base section 1300 has opposed first open-ended slots 1322 formed in opposed third and fourth sidewalls 1306, 1308 adjacent or near sidewall 1302. In one variation, slots 1322 are each a distance D of less than about two inches from sidewall 1302. In another variation, slots 1322 are each within a distance D of one to one-half inch from sidewall 1302. Each of opposed slots 1322 extends through the upper edges 1324 of third and fourth sidewalls 1306, 1308 toward bottom wall 1310 and preferably has a length L greater than its width W. The length L of slots 1322 is less than the height H of third and fourth sidewalls 1306, 1308 such that the third and fourth sidewalls extend continuously from end-to-end beneath slots 1322. In one embodiment, slots 1322 extend over half the height of sidewalls 1306, 1308.

In one variation, second side wall 1304 has a plurality of spaced apart open ended second slots 1326 formed along the length of the sidewall that extend through the upper edge 1328 toward the bottom wall 1310. Second slots 1326 preferably have a length L greater than width W with the length L of the slots less than the height H of the second sidewall 1304 so that the second sidewall extends continuously between the first and second ends 1312, 1314 of the sidewall beneath slots 1326. In the illustrated embodiment, two slots 1326, 1326' are positioned such that slot 1326 is adjacent end 1312 of sidewall 1304 with the other slot 1326' positioned adjacent end 1314 of sidewall 1304. In one variation, slots 1326, 1326' are each a distance D1 of less than about two inches from ends 1312, 1314, respectively. In another variation, slots 1326, 1326' are each within a distance D1 of one to one-half inch from ends 1312, 1314, respectively. In one variation distance D is equal to, or approximately equal to distance D1. In other variations, distance D may be greater or less than Distance D1.

Slots 1322, 1326 permit a user to route one or more cables into and out of base section 300 when cover section 1400 is removed without disconnecting the cable from connected devices. Slack portions of the cables are stored inside base section 1300. In one variation, slots 1322, 1326 have the same dimensions. However, in other variations, slots 1322 may have dimensions different from slots 1326. In order to retain structural integrity of sidewalls 1304-1308, open ended slots 1322, 1326 are configured to extend only partially though the height of the sidewalls such that a portion of each sidewall extends continuously from end-to-end beneath the slots.

As best illustrated in FIG. 30, cover section 1400 includes opposed first and second walls 1402, 1404, opposed third and fourth sidewalls 1406, 1408 and a top wall 1410. First and second sidewalls 1402, 1404 are joined along first ends 1412 to third sidewall 1406 and along second ends 1414 to fourth sidewall 1408 along the height of the sidewalls. Sidewalls 1402-1408 are each joined along upper edges 1416 to the edges 1418 of top wall 1410 to form a generally rectangular enclosure having an open side 1420.

Cover section 1400 has opposed first slots 1422 formed in opposed third and fourth sidewalls 1406, 1408 adjacent or near sidewall 1402. In one variation, slots 1422 are each a distance E of less than about two inches from sidewall 1402. In another variation, slots 1422 are each within a distance E of one to one-half inch from sidewall 1402. Each of opposed slots 1422 extends through the lower edges 1424 of third and fourth sidewalls 1406, 1408 toward top wall 1410 and preferably has a length L greater than its width W. The length L of slots 1422 is less than the height H of third and fourth sidewalls 1406, 1408 such that the third and fourth sidewalls extend continuously from end-to-end above slots 1422.

Second sidewall 1404 has a plurality of spaced apart second slots 1426 formed along the length of the sidewall that extend through lower edge 1428 toward top wall 1410. Second slots 1426 preferably have a length L greater than width W with the length L of the slots less than the height H of second sidewall 1404 so that the second sidewall extends continuously from end-to-end between the first and second ends 1412, 1414 of the sidewall above slots 1426 to maintain the structural integrity of the sidewall. In the illustrated embodiment, two slots 1426, 1426' are positioned such that slot 1426 is adjacent end 1412 of sidewall 1404 with the other slot 1426' positioned adjacent end 1414 of sidewall 1404. In one variation, slots 1426, 1426' are each a distance E1 of less than about two inches from ends 1412, 1414, respectively. In another variation, slots 1426, 1426' are each within a distance E1 of one to one-half inch from ends 1412, 1414, respectively. In one variation distance E is equal to, or approximately equal to distance E1. In other variations, distance E may be greater or less than Distance E1.

Slots 1422 may have the same or different dimensions as slots 1426. In one variation, slots 1422 of cover section 1400 have the same, or approximately the same, width as corresponding slots 1322 of base section 1300. Similarly, slots 1426 have the same, or approximately the same, width as slots 1326 of base section 1300. In the illustrated variation, exactly two spaced-apart slots 1426 are formed in second sidewall 1404. In one variation, distances D, E will be approximately the same and distances D1, E1 will be approximately the same. In another variation, distances E and E1 will be greater than distances D and D1, respectively, to compensate for the thickness of the sidewalls 1402-1408 and the dimensional differences between cover section 1400 and base section 1300.

Referring now to FIG. 32, the outside length 1336 and width 1338 of base section 1300 is slightly less than the inside length 1436 and 1438 of cover section 1400 so that the cover can be fitted over the base. Slots 1322, 1326 of base section 1300 and slots 1422, 1426 of cover section 1400 are positioned in sidewalls 1304, 1306 and 1308 and 1404, 1406 and 1408, respectively, such that the slots are aligned when the cover section is fitted over the base section. As illustrated, slots 1422, 1426 overlap slots 1322, 1326 when cover section 1400 is fitted over base section 1300 to form passageways 1350, 1352, respectively though which cables may be routed through the base section 1300. In one embodiment, slots 1322, 1326 and 1422, 1426 are formed with curved ends 1342, 1346 and 1442, 1446 such that passageways 1350, 1352 are generally oval or circular. In other variations, ends 1342, 1346 and 1442, 1446 may be triangular, square or another geometric configuration.

In one variation, there is exactly one slot 1322 in each of third and fourth sidewalls 1306-1308 of base section 1300 and exactly two slots 1326 formed in second sidewall 1304 of the base section. In this variation, there is exactly one slot 1422 formed in each of third and fourth sidewalls 1406, 1408 of cover section 1400 and exactly two slots formed in second sidewall 1404 of the cover section. Slots 1322 and 1326 are positioned to align with slots 1422 and 1426 when cover section 1400 is fitted over base section 1300 to form passageways 1350, 1352 when cover section 1400 is fitted over base section 1300. In this manner, exactly one passageway 1350 is formed by sidewalls 1306 and 1406, one by sidewalls 1308 and 1408, and exactly two passageways are formed by sidewalls 1304, 1404, with the top and bottom of the enclosure 50 being entirely closed. In one variation, the side of enclosure 50 corresponding to first sidewalls 1302, 1402, is also completely closed. Enclosure 50 may also be provided with latch mechanisms 1380 to secure cover section 1300 on base section 1400. Latch mechanisms 1380 may be the same or similar to latch mechanisms 380 of enclosure 20, described above.

In many applications, enclosures according to the disclosure will be placed against a wall or other surface such that access to one side of the enclosure will be blocked. Thus, the enclosures of FIGS. 7, 16, 20, 28, and 32 are configured with passageways in three sides of the enclosures with the top, bottom and fourth side being entirely closed. The fourth side of the enclosures, having no passageway, may be placed against a wall or other surface. In particular, enclosure 50 of FIG. 32 is configured with opening 1350 near closed sidewalls 1302 and 1402 such that the closed sidewalls may be placed next to a wall or desk with cables routed into the enclosure near the wall or desk. The cables may then be routed out of enclosure 50 though openings 1352.

In some variations, it is desirable to form the base section and/or top sections of enclosures 10, 20, 30, 40 or 50 from waterproof materials such as a suitable plastic, metal or treated wood or cardboard to avert moisture damage to the enclosures and to prevent water from entering the enclosures. In other variations, it may be desirable to form the base section and/or top sections of the enclosures from fireproof materials.

Enclosures 10, 20, 30, 40 and 50 are dimensioned with sufficient volume to contain segments of slack cable. In one variation, cover sections base sections 100, 300, 500, 700, 900, and 1300 have a width of between 3 and 16 inches, a length between 6 and 24 inches and a depth between 3 and 12 inches with the corresponding cover sections being slightly larger so as to fit over the base sections. Other dimensions are possible, however, in most applications the enclosures will preferably fit under a desk, between a desk and a wall, or in a similar location. Hence, it is desirable to size the enclosures so as to contain significant lengths of slack cable while simultaneously fitting into relatively small areas.

The drawings and detailed description herein are to be regarded in an illustrative rather than a restrictive manner, and are not intended to limit the following claims to the particular forms and examples disclosed. On the contrary, further modifications, changes, rearrangements, substitutions, alternatives, design choices, and embodiments will be apparent to those of ordinary skill in the art. Thus, it is intended that the following claims be interpreted to embrace all such further modifications, changes, rearrangements, substitutions, alternatives, design choices, and embodiments.

What is claimed is:

1. An enclosure for storing cables comprising:
 a base section having a bottom wall, opposed first and second sidewalls and opposed third and fourth sidewalls, the first sidewall having first and second ends joined to first ends of the third and fourth sidewalls along the height of the sidewalls, the second sidewall being joined to second ends of the third and fourth sidewall along the height thereof, the first, second, third and fourth sidewalls being joined to the bottom wall along lower edges of the sidewalls, the bottom wall, opposed first and second sidewalls and opposed third and fourth sidewalls defining a generally rectangular container having an open side and an outer length and width;
 the first and second sidewalls of the base section having first slots formed along the length thereof, each of the first slots extending through upper edges of the first and second sidewalls toward the bottom wall, each of the first slots having a length less than the height of the first and second sidewalls such that the first and second sidewalls extend continuously from the first and second ends thereof beneath the slot;

the third sidewall of the base section having a second slot extending through the upper edge toward the bottom wall, the second slot having a length less than the height of the third sidewall such that the third sidewall extends continuously from the first and second ends thereof beneath the slot;

a cover section having a top wall, opposed first and second sidewalls and opposed third and fourth sidewalls, the first sidewall having first and second ends joined to first ends of the third and fourth sidewalls along the height of the sidewalls, the second sidewall being joined to second ends of the third and fourth sidewall along the height of the sidewalls, the first, second, third and fourth sidewalls being joined to the top wall along upper edges thereof, the top wall, opposed first and second sidewalls and opposed third and fourth sidewalls defining a generally rectangular container having an open side having an inner length and width sufficiently larger than the outer length and width of the base section such that the sidewalls of the base section fit into the open side of the cover section; and the first and second sidewalls of the cover section each having third slots formed along the length of the sidewalls, each of the third slots extending through lower edges of the first and second sidewalls toward the top wall, each of the third slots having a length less than the height of the first and second sidewalls such that the first and second sidewalls extend continuously from the first and second ends thereof above the third slot;

the third sidewall of the cover section having a fourth slot formed along the length of the sidewall, the fourth slot extending through the lower edge of the third sidewall toward the top wall, the fourth slot having a length less than the height of the third sidewall such that the third sidewall extends continuously from the first and second ends thereof beneath the fourth slot;

wherein the base section is received in the cover section with the first slots aligned with the third slots and the second slot aligned with the fourth slot, the slots having a length sufficient to define first, second and third passageways through overlapping portions of the first, second and third sidewalls of the base section and cover section.

2. The enclosure of claim 1 further comprising a latching mechanism having a first component secured to an outer surface of at least two opposing ones of the first, second, third and fourth sidewalls of the base section and a second component secured to an inner surface of at least two opposing ones of the of the first, second, third and fourth sidewalls of the cover section, the first components engaging the second components when the cover section is placed over the base section to releasably secure the cover section onto the base section with the slots of the cover section aligned and overlapping the slots of the base section to form a plurality of passageways through overlapping portions of the sidewalls of the cover section and sidewalls of the base section.

3. The enclosure of claim 2 further comprising a plurality of first latching members secured to an outer surface of at least two opposing ones of the first, second, third and fourth sidewalls of the base section and a plurality of second components secured to an inner surface of at least two opposing ones of the of the first, second, third and fourth sidewalls of the cover section, the first components engaging the second components when the cover section is placed over the base section to releasably secure the cover section onto the base section at a plurality of selected heights with the slots of the cover section aligned and overlapping the slots of the base section to form a plurality of passageways through overlapping portions of the sidewalls of the cover section and sidewalls of the base section.

4. The enclosure of claim 1 wherein the third sidewall of the base section has a fifth slot extending through the upper edge toward the bottom wall, the fifth slot having a length less than the height of the third sidewall such that the third sidewall extends continuously from the first and second ends thereof beneath the fifth slot;

wherein the third sidewall of the cover section has a sixth slot extending through the lower edge toward the top wall, the sixth slot having a length less than the height of the third sidewall such that the third sidewall extends continuously from the first and second ends thereof above the sixth slot; and wherein the base section is received in the cover section with the fifth slot aligned with the sixth slot, the slots having a length sufficient to define a fourth passageway through overlapping portions of the third sidewalls of the base section and cover section.

5. The enclosure of claim 1 wherein the third sidewall of the base section is formed with a pair of spaced apart second slots extending through the upper edge toward the bottom wall, the second slots each having a length less than the height of the third sidewall such that the third sidewall extends continuously from the first and second ends thereof beneath the slots;

wherein the third sidewall of the cover section is formed with a pair of spaced apart fourth slots extending through the lower edge toward the top wall, the fourth slots each having a length less than the height of the third sidewall of the cover section such that the third sidewall extends continuously from the first and second ends thereof above the slots; and wherein the base section is received in the cover section with the spaced apart second slots aligned with the spaced apart fourth slots, the slots having a length sufficient to define a pair of fourth passageways extending through overlapping portions of the third sidewalls of the base section and cover section.

6. The enclosure of claim 1 wherein the base section is formed with exactly one first open ended slot in each of opposing first and second sidewalls, each of the slots having a length less than the height of the first and second sidewalls such that the sidewalls extend continuously from end to end below the sidewalls;

wherein the base section is formed with exactly two spaced apart open ended second slots formed in the third sidewall, each of the slots having a length less than the height of the third sidewall such that the third sidewall extends continuously from end to end below the slots;

wherein the cover section is formed with exactly one open ended third slot in each of opposing first and second sidewalls, each of the slots having a length less than the height of the first and second sidewalls such that the sidewalls extend continuously from end to end above the sidewalls;

wherein the cover section is formed with exactly two spaced apart open ended fourth slots formed in the third sidewall, each of the slots having a length less than the height of the third sidewall such that the third sidewall extends continuously from end to end above the slots;

wherein the base section is received in the cover section with the first slots aligned with the second slots and the spaced apart third slots aligned with the spaced apart fourth slots, the slots having a length sufficient to define first, second, third and fourth slots of variable height that from passageways through overlapping portions of the first, second and third sidewalls of the base section and cover section, the passageways having variable height to accommodate different numbers of cables routed through the enclosure by means of the passageways.

7. The enclosure of claim 1 wherein the cover section and the base section are formed from one or more of plastic, wood, cardboard and sheet metal.

8. The enclosure of claim 1 wherein the bottom wall of the base section, the fourth sidewall of the base section, the top wall of the cover section and the fourth sidewall of the cover section are solid with substantially no opening therethrough.

9. The enclosure of claim 1 wherein one or more of the slots are defined by a series of perforations wherein the slot is opened by removing a portion of the corresponding sidewall within the perforations.

10. The enclosure of claim 1 further comprising one or more brackets positioned adjacent one or more of the slots, the brackets configured to receive blanks to close the corresponding passageway.

11. The enclosure of claim 1 further comprising a flexible curtain positioned over one or more of the slots to close the corresponding passageway.

12. The enclosure of claim 1 wherein the length of the slots is from about 50% to about 80% of the height of the corresponding sidewalls.

13. The enclosure of claim 12 wherein the width of slots is from about 20% of the length of the slots to about 50% of the length of the slots.

14. A plurality of enclosures for storing cables comprising:
a set of nested base sections including an inner base section, an outer base section and a plurality of base sections disposed between the inner and outer base sections in nested relationship, each base section having a bottom wall, opposed first and second sidewalls and opposed third and fourth sidewalls, the first sidewall having first and second ends joined to first ends of the third and fourth sidewalls along the height thereof, the second sidewall being joined to second ends of the third and fourth sidewall along the height thereof, the first, second, third and fourth sidewalls being joined to the bottom wall along lower edges thereof, the bottom wall, opposed first and second sidewalls and opposed third and fourth sidewalls defining a generally rectangular container having an open upper side, an outer length and width and an inner length and width wherein each successive base section between the inner base section and the outer base section has a slightly smaller outer length and width than the inner outer length and width of an adjacent base section in which it is nested;
the first and second sidewalls of each of the nested base sections having first slots formed generally midway along the length thereof, each of the first slots extending through upper edges of the first and second sidewalls toward the bottom wall, each of the first slots having a length less than the height of the first and second sidewalls such that the first and second sidewalls extend continuously from the first and second ends thereof beneath the slot;
the third sidewall of each of the nested base sections having a second slot formed generally midway along the length thereof, the second slot extending through the upper edge toward the bottom wall, the second slot having a length less than the height of the third sidewall such that the third sidewall extends continuously from the first and second ends thereof beneath the slot; and
a set of nested cover sections corresponding to the nested base sections, including an inner cover section, an outer cover section and a plurality of cover sections disposed between the inner and outer cover sections in nested relationship, each of the nested cover sections having a top wall, opposed first and second sidewalls and opposed third and fourth sidewalls, the first sidewall having first and second ends joined to first ends of the third and fourth sidewalls along the height thereof, the second sidewall being joined to second ends of the third and fourth sidewall along the height thereof, the first, second, third and fourth sidewalls being joined to the top wall along upper edges thereof, the top wall, opposed first and second sidewalls and opposed third and fourth sidewalls defining a generally rectangular container having an open side having an inner length and width slightly larger than the outer length and width of the corresponding base section, and wherein each successive cover section between the inner cover section and the outer cover section has a slightly smaller outer length and width than the inner length, width and depth of an adjacent cover section in which it is nested;
the first and second sidewalls of each of cover sections each having a third slot formed generally midway along the length thereof, each of the third slots extending through lower edges of the first and second sidewalls toward the top wall, each of the third slots having a length less than the height of the first and second sidewalls such that the first and second sidewalls extend continuously from the first and second ends thereof above the third slot;
the third sidewall of each of the cover sections having a fourth slot formed generally midway along the length thereof, the fourth slot extending through the lower edge of the third sidewall toward the top wall, the fourth slot having a length less than the height of the third sidewall such that the third sidewall extends continuously from the first and second ends thereof beneath the fourth slot.

15. The enclosures of claim 14, each enclosure further comprising:
a latching mechanism having a first component secured to an outer surface of at least one of the first, second, third and fourth sidewalls of each base section and a second component secured to an outer surface of at least one of the first, second, third and fourth sidewalls of each cover section; and
wherein each base section is received in the corresponding cover section with the first slots aligned with the third slots and the second slots aligned with the fourth slots, the slots having a length sufficient to define first, second, third and fourth passageways through overlapping portions of the first, second and third sidewalls of the base section and cover when a sidewall of the base section is abutted against an inside surface of the top wall of the corresponding cover section with the first component of the latching member engaging the second component of the latching member to releasably secure the cover section over the corresponding base section.

16. The enclosures of claim 14, wherein the slots of each base section are aligned in the nested plurality of base sections and wherein the slots of each of the cover sections are aligned in the nested plurality of cover sections.

17. An enclosure for storing cables comprising:
a base section having a bottom wall, opposed first and second sidewalls and opposed third and fourth sidewalls, the first sidewall having first and second ends joined to first ends of the third and fourth sidewalls along the height of the sidewalls, the second sidewall being joined to second ends of the third and fourth sidewall along the height thereof, the first, second, third and fourth sidewalls being joined to the bottom wall along lower edges of the sidewalls, the bottom wall, opposed first and second sidewalls and opposed third and fourth sidewalls defining a generally rectangular container having an open side and an outer length and width;

the first and second sidewalls of the base section having first slots formed generally midway along the length thereof, each of the first slots extending through upper edges of the first and second sidewalls toward the bottom wall, each of the first slots having a length greater than width with the length of the slots being less than the height of the first and second sidewalls such that the first and second sidewalls extend continuously from the first and second ends thereof beneath the slot;

the third sidewall of the base section having a second slot extending through the upper edge toward the bottom wall, the second slot having a length greater than width with the length of the slot less than the height of the third sidewall such that the third sidewall extends continuously from the first and second ends thereof beneath the slot;

a cover section having a top wall, opposed first and second sidewalls and opposed third and fourth sidewalls, the first sidewall having first and second ends joined to first ends of the third and fourth sidewalls along the height of the sidewalls, the second sidewall being joined to second ends of the third and fourth sidewall along the height of the sidewalls, the first, second, third and fourth sidewalls being joined to the top wall along upper edges thereof, the top wall, opposed first and second sidewalls and opposed third and fourth sidewalls defining a generally rectangular container having an open side having an inner length and width sufficiently larger than the outer length and width of the base section such that the sidewalls fit into the open side of the cover section; and the first and second sidewalls of the cover section each having third slots formed generally midway along the length of the sidewalls, each of the third slots extending through lower edges of the first and second sidewalls toward the top wall, each of the third slots having a length greater than width with the length of the slots being less than the height of the first and second sidewalls such that the first and second sidewalls extend continuously from the first and second ends thereof above the third slot;

the third sidewall of the cover section having a fourth slot formed generally midway along the length of the sidewall, the fourth slot extending through the lower edge of the third sidewall toward the top wall, the fourth slot having a length greater than width with the length of the slot less than the height of the third sidewall such that the third sidewall extends continuously from the first and second ends thereof beneath the fourth slot;

wherein the base section is received in the cover section with the first slots aligned with the third slots and the second slot aligned with the fourth slot, the slots having a length sufficient to define variable height first, second and third passageways through overlapping portions of the first, second and third sidewalls of the base section and cover section, the passageways having variable height to accommodate different numbers of cables routed through the enclosure by means of the passageways.

18. The enclosure of claim 17 wherein lower ends of the first and second slots are horizontally aligned with lower edges of the sidewalls of the cover section when the cover section is fully seated on the base section.

19. The enclosure of claim 17 wherein one or more of the slots is provided with a flexible curtain to close the corresponding passageway when the passageway is not in use.

20. The enclosure of claim 17 further comprising a latching mechanism having a first component secured to an outer surface of at least two opposing ones of the first, second, third and fourth sidewalls of the base section and a second component secured to an outer surface of at least two opposing ones of the of the first, second, third and fourth sidewalls of the cover section, the first components engaging the second components when the cover section is placed over the base section to releasably secure the cover section onto the base section with the slots of the cover section aligned and overlapping the slots of the base section to form a plurality of passageways through overlapping portions of the sidewalls of the cover section and sidewalls of the base section.

* * * * *